(12) United States Patent
Keane et al.

(10) Patent No.: US 9,186,726 B2
(45) Date of Patent: Nov. 17, 2015

(54) METHODS OF FORMING A METALLIC OR CERAMIC ARTICLE HAVING A NOVEL COMPOSITION OF FUNCTIONALLY GRADED MATERIAL AND ARTICLES CONTAINING THE SAME

(71) Applicant: ALLOMET CORPORATION, North Huntingdon, PA (US)

(72) Inventors: John M. Keane, Harrison City, PA (US); Richard E. Toth, North Huntingdon, PA (US)

(73) Assignee: Allomet Corporation, N. Huntingdon, PA (US)

( * ) Notice: Subject to any disclaimer, the term of this patent is extended or adjusted under 35 U.S.C. 154(b) by 0 days.

(21) Appl. No.: 14/039,005

(22) Filed: Sep. 27, 2013

(65) Prior Publication Data

US 2014/0087210 A1     Mar. 27, 2014

Related U.S. Application Data

(60) Provisional application No. 61/706,693, filed on Sep. 27, 2012, provisional application No. 61/736,791, filed on Dec. 13, 2012.

(51) Int. Cl.

| | |
|---|---|
| *B22F 7/02* | (2006.01) |
| *C04B 35/64* | (2006.01) |
| *B23B 5/16* | (2006.01) |
| *B22F 1/02* | (2006.01) |
| *B22F 3/02* | (2006.01) |
| *B22F 7/06* | (2006.01) |
| *C22C 26/00* | (2006.01) |
| *C22C 29/08* | (2006.01) |
| *B22F 5/00* | (2006.01) |

(52) U.S. Cl.
CPC ... *B22F 7/02* (2013.01); *B22F 1/02* (2013.01); *B22F 3/02* (2013.01); *B22F 7/06* (2013.01); *B23B 5/16* (2013.01); *C04B 35/64* (2013.01); *C22C 26/00* (2013.01); *C22C 29/08* (2013.01); *B22F 2005/001* (2013.01); *Y10T 428/11* (2015.01); *Y10T 428/12028* (2015.01)

(58) Field of Classification Search
CPC ............... B22F 7/02; B22F 1/02; B22F 3/02; B22F 7/06; B22F 2005/001; C04B 35/64; B23B 5/16; C22C 26/00; C22C 29/08; Y10T 428/11; Y10T 428/12028
USPC .................................. 428/548, 810; 264/625
IPC ................. B22F 7/02; B32B 5/16; C04B 35/64
See application file for complete search history.

(56) References Cited

U.S. PATENT DOCUMENTS

2005/0275143 A1    12/2005   Toth

FOREIGN PATENT DOCUMENTS

| | | |
|---|---|---|
| JP | 11-36005 H | 2/1999 |
| JP | 2000-328170 | * 11/2000 |
| JP | 2000-328170 A | 11/2000 |
| WO | 98/51419 A1 | 11/1998 |
| WO | 2011/017318 A1 | 2/2011 |
| WO | WO2011/017318 | * 2/2011 |

OTHER PUBLICATIONS

International Search Report from the European Patent Office for International Application No. PCT/US2013/062179 dated Oct. 2, 2014.
Written Opinion of the International Searching Authority from the International Searching Authority for International Application No. PCT/US2013/062179 dated Feb. 10, 2014.

* cited by examiner

*Primary Examiner* — Leszek Kiliman
(74) *Attorney, Agent, or Firm* — Finnegan, Henderson, Farabow, Garrett & Dunner, LLP

(57) ABSTRACT

There is disclosed a method of making a metallic or ceramic component, such as a cutting or forming tool, from at least two distinct powder precursors. In one embodiment, the method comprising forming a first mixture comprised of a plurality of coated particles, such as Tough-Coated Hard Powder (TCHP) composite particles created by encapsulating extremely hard core particles with very tough binder and structural materials, and at least one support powder, such as a carbide, typically WC—Co. The mixture is formed into a green body and sintered to form a functionally graded or multicomponent article. Non-limiting examples of the articles made from the disclosed methods are also disclosed and include drills, mills, cutting tools, forming tools, wires dies and mechanical components.

23 Claims, 14 Drawing Sheets

Top overview (10X) of sintered TCHP powder and selected WC-Co powder

50X SEM image of polished top face of sintered TCHP powder and selected WC-Co powder (A) 500X SEM image from cross-section of sintered TCHP powder and selected WC-Co powder (B) Backscattered electron SEM image from cross-section of sintered TCHP powder and selected WC-Co powder Sintered interface (250X view) between pressed TCHP powder and selected WC-Co powder Cross-section (10X view) of sintered TCHP powder and a different WC-Co powder Sample A      TL-3 (inner) with WC-15Co (outer)

METHODS OF FORMING A METALLIC OR CERAMIC ARTICLE HAVING A NOVEL COMPOSITION OF FUNCTIONALLY GRADED MATERIAL AND ARTICLES CONTAINING THE SAME

CROSS-REFERENCE TO RELATED APPLICATIONS

This application claims the benefit of U.S. Provisional Application No. 61/706,693 filed Sep. 27, 2012, and U.S. Provisional Application No. 61/736,791 filed Dec. 13, 2012, both disclosures of which are incorporated herein by reference.

FIELD OF THE INVENTION

The present invention relates to a method of making metallic and ceramic articles, such as drills, mills, cutting and forming tools, wire dies, and mechanical components having non-uniform compositions by forming green bodies of powders of different compositions, and compacting and sintering such green bodies.

BACKGROUND OF THE INVENTION

Tool life is determined by the tool's resistance to several types of wear and its response to heavy loads and to shock, with the reality that wear resistance is generally increased at the expense of strength. Today, the best tools exhibit the best compromises, and therefore are limited to use in special applications. To limit such compromises, coating techniques have been used to permit not only longer tool life but also increased cutting speeds and feeds. Powder metallurgy and sintering have lead to the development of new materials with enhanced hardness and toughness. Adding a hard coating to the sintered alloy such as by chemical vapor deposition (CVD), physical vapor deposition (PVD), or plasma-assisted chemical vapor deposition (PACVD) has increased wear resistance.

Mechanical properties have been improved by various engineering modifications, including lamination, part geometry, and by additional mechanical and/or thermal processes to enhance localized wear resistance. However, these additional processes add cost and lead times and often require more process steps such as brazing, forging, heat treatment, grinding, or lapping.

The external coating solution has several major disadvantages, including coating delamination and cracking in use (from different coating and substrate thermal expansion rates and from bending and surface loads) and the high CVD process temperatures required (900° C.-1200° C.) may not be consistent with the heat-treatment needed for the strength or the geometry of the sintered part.

Moreover, even with the use of high performance coatings on the surface of tools, the coatings eventually fail, and as the properties of the underlying material are insufficient to operate at cutting speeds the tool fails very quickly. While such tools could be rejuvenated by reapplying a CVD coating, the reapplication of a coating or multiple coatings is generally not economically feasible.

Accordingly one object of the invention to provide a novel Functionally Graded Material (FGM) having properties that can be altered at different locations in the tool or article without exhibiting failure at the interface between the different areas in the tool or article. This novel FGM is assembled of green sinterable powders, which may be plasticized powders, with common or compatible matrix and binder materials that enable designed interface transitional gradients and a bonding strength many times greater than in conventional laminar interfaces.

Another object of the invention is to provide an increase with respect to conventional wear laminates in the extremes of the wear, coefficient of friction, and toughness properties available at the working surfaces and cutting edges of the tool or article.

Yet another object of the invention is to provide a designed and engineered transition of properties rather than accepting natural or weaker interfaces. Still another object of the invention is to provide economy of manufacture by (a) reducing amounts of expensive materials needed, (b) using continuous extrusion, powdered injection molding (PIM), or calendering of plasticized powdered metals and ceramics, or dry powder layering of powdered metals and ceramics, and (c) reducing cost by reducing the number of process steps or process steps necessary to produce a tool or part.

These objectives are achieved by forming the tool or article from different types of the compacted and sintered material, such as the Tough-Coated Hard Powders (TCHP), disclosed in U.S. Pat. No. 6,372,346, which is herein incorporated by reference in its entirety. Such a material exhibits the combination of properties needed to provide superior metal cutting tools and articles. Because of the nature of the binder materials that bond the particles into the sintered article comprised of TCHP, the interface between the laminations is unusually strong. This strength is further enhanced by gradually transitioning the materials using extrusion or injection dies, rollers, or mold forms that provide unique grooves that interlock the different materials at their layered interfaces.

SUMMARY OF THE INVENTION

In accordance with the invention, there is provided a method of making an article of functional graded materials. The method comprises: providing a composite powder such as the previously mentioned TCHP and at least one "support" powder.

In one embodiment, the first powder is comprised of a plurality of core particles consisting essentially of a first metal compound or a plurality of metal compounds having the formula $M_aX_b$ where M is a metal selected from the group consisting of: titanium, zirconium, hafnium, vanadium, niobium, tantalum, chromium, molybdenum, tungsten, aluminum, magnesium, copper, and silicon; X is an element chosen from nitrogen, carbon, boron, sulfur, and oxygen; and a and b are numbers greater than zero up to and including fourteen.

In one non-limiting embodiment, the core particle material is selected from the group consisting of: TiN, Ti(C,N), TiC, $TiB_2$, ZrC, ZrN, $ZrB_2$, HfC, HfN, $HfB_2$, $TaB_2$, VC, VN, cBN, hBN, $Al_2O_3$, $Si_3N_4$, $SiB_6$, SiAlCB, $B_4C$, $B_2O_3$, $W_2B_5$, $WB_2$, $WS_2$, AlN, $AlMgB_{14}$, $MoS_2$, $MoSi_2$, $Mo_2B_5$, $MoB_2$, MoFeB (iron molybdenum boride), diamond and mixtures thereof.

The core particles have thereon an intermediate layer that consists essentially of a second metal compound, different in composition from the first metal compound and having a higher relative fracture toughness. The second metal compound is capable of bonding with the first metal compound and is capable of bonding with a metal selected from the group consisting of iron, cobalt, nickel, copper, titanium, aluminum, magnesium, lithium, beryllium, silver, gold, and platinum. The combination of the core particle and the intermediate layer form coated particles.

A first binder overlays the intermediate layer on the coated particles and the binder comprises at least one of iron, cobalt, nickel, their mixtures, their alloys, or their intermetallic compounds. In one embodiment, a second powder mixture, such as a TCHP powder having core particles or other constituents different from the first TCHP powder may be formed into a second powder mixture.

In order to prepare the first powder of TCHP particulate matter and the second powders for extrusion, injection, or calendering through profiled dies or rollers into a precompaction mold, they can be plasticized into a high viscosity but flowable and moldable state. Plasticizing binders typically used to add flowability of the powders described herein include, but are not limited to, paraffin waxes, stearic acid, ethylene bis-stearamide (EBS), ethylene vinyl acetate, plasticizers (such as polyvinyl alcohol, polyethylene glycol, or synthetic resins), and similar related organic compounds mixed or blended, such as co-polymers of the foregoing. These plasticizing agents may be mixed with or without the addition of heat most often in the range of 30° C. to 150° C., with a plurality of the component particles prior to or simultaneous with extrusion, injection, or calendering. In the case of dry powder layering, the powders are mass flow control conveyed to their point of assembly and compacted in molds without the aid of extruders, injectors, or calenders. Waxes may be used as consolidation and demolding aids.

Tough-Coated Hard Particles (TCHPs) are designed microstructures, and in some cases, nanostructures, created by encapsulating extremely hard core particles (including, cubic boron nitride, diamond, alumina, silicon carbide, and titanium nitride) with very tough materials (including, tungsten carbide+cobalt or steel), which in the consolidation process become the contiguous matrix. In a single TCHP variety, as many desired properties can coexist as there are different core particle materials present in its uniform tough substrate. In one preferred embodiment, the TCHP powder contains Co in an amount ranging from 9-10% by weight. This preferred material has a sintered shrinkage of about 16%.

The contiguous matrix in the first plastic powder mixture provides the tough support matrix that holds the wear resistant particles in place. This plastic powder mixture is located in zones or on surfaces whose primary function is wear resistance, low friction coefficient and/or other desired properties or property combinations such as thermal and electrical conductivity, corrosion resistance, or thermal expansion coefficient.

The function of the second plastic powder mixture is to provide a substrate layer or zones whose primary function is to provide added fracture toughness and/or other desired properties or property combinations such as thermal and electrical conductivity, corrosion resistance, or thermal expansion coefficient, and to reduce cost. In one embodiment, the chemical composition of the second composite powder is very similar to (or at least bondable to and sinterable with) the contiguous matrix of the first plastic powder mixture. This gives a metallurgical or chemical bond that provides an interface strength that is undiminished in comparison with the two substrates.

In one embodiment, the second powder is a composite of cobalt-coated WC particles or a WC—Co mixture or is a steel, tool steel, stainless steel, titanium, aluminum, or other powder that is essentially the same as the contiguous matrix of the first powder.

Alternatively, the second powder composition is chemically or metallurgically compatible with and bondable to the contiguous matrix of the first powder.

Whereas some laminations require a significant difference in the amount of the binder or bonding elements or compounds present in the different layers to promote diffusion and bonding between the layers, substrate material laminations with Functionally-Graded TCHP-based laminations selected to have essentially equivalent binder or bonding phases do not.

The method described herein may further comprise any number of mixtures of additional TCHP powders, as previously described. For example, in one embodiment, there is disclosed one or more support powders, as previously described, and at least two TCHP powders, as previously described, e.g., core particles consisting essentially of a metal compound having the formula $M_aX_b$ where M is a metal selected from the group consisting of: titanium, zirconium, hafnium, vanadium, niobium, tantalum, chromium, molybdenum, tungsten, aluminum, magnesium, copper, and silicon; X is an element chosen from nitrogen, carbon, boron, sulfur, and oxygen; and a and b are numbers greater than zero up to and including fourteen.

In one non-limiting embodiment, the core particle material being selected from the group consisting of: TiN, Ti(C,N), TiC, $TiB_2$, ZrC, ZrN, $ZrB_2$, HfC, HfN, $HfB_2$, $TaB_2$, VC, VN, cBN, hBN, $Al_2O_3$, $Si_3N_4$, $SiB_6$, SiAlCB, $B_4C$, $B_2O_3$, $W_2B_5$, $WB_2$, $WS_2$, AlN, $AlMgB_{14}$, $MoS_2$, $MoSi_2$, $Mo_2B_5$, $MoB_2$, MoFeB, diamond and mixtures thereof.

In one embodiment, the core particle material comprises a mixed Fe—Mo—B compound with a range of stoichiometries, which may be substituted with Co, Ni as similar substituents.

In another non-limiting embodiment, the intermediate layer is selected from the group consisting of: WC, TaC, $W_2C$, and a mixture of WC and $W_2C$.

The core particles of the second mixture have at least one of M, X, a and b different than the M, X, a and b in the first plastic mixture. The core particles of the second mixture have thereon an intermediate layer that consists essentially of the second metal compound of the first plastic mixture. The combination of the core particle of the third compound and its intermediate layer forming second coated particles.

The various powder mixtures are formed into a green body such that the first powder forms a first portion of the green body, the second powder mixture forming a second portion of the green body, and so on.

Non-limiting methods of forming, shaping, and pressing the green body assembly include extrusion, coextrusion, powder injection molding, tape-casting, calendering, dry powder layering, slurry casting, centrifugal slurry casting, and wet powder spraying, slurry for 3D shape, centrifugal for coating a pipe, and wet spraying to deposit on outside of axial symmetric shape.

To achieve a true engineered transition zone between the layers, steeply-grooved extrusion dies may be provided in the extrusion, injection, calendering, or dry powder delivery apparatus that provide a more intimate interface between the different green layers to provide a novel interlocking imbrication of the different materials in the transitional interface zone.

One material to be used in the wear zones is TCHP. In addition, materials to be used in the structural zones are comprised of the intermediate and binder layer materials used in the TCHP with a reduced volume percent of core particles or no core particles. The green body assembly may then be compacted to form a compact or it may be injected directly into a mold. The compact is then sintered to form an article having zones of different properties, the first portion of the green body forming a hard, wear-resistant portion of the article and the second portion of the green body forming a tough, strong load bearing portion of the article or component.

The novel joining together of green powder mixtures as functionally graded materials brings reality to the term "functional gradient." For example, it can add properties in fewer operations to automotive components such as gears and camshafts that normally require thermal or physical operations such as heat treatment or forging that require added cost and long processing times.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The accompanying drawings, which are incorporated in and constitute a part of this specification, illustrate one embodiment of the invention and together with the description, serve to explain the principles of the invention.

DESCRIPTION OF THE EMBODIMENTS

Figure 1:
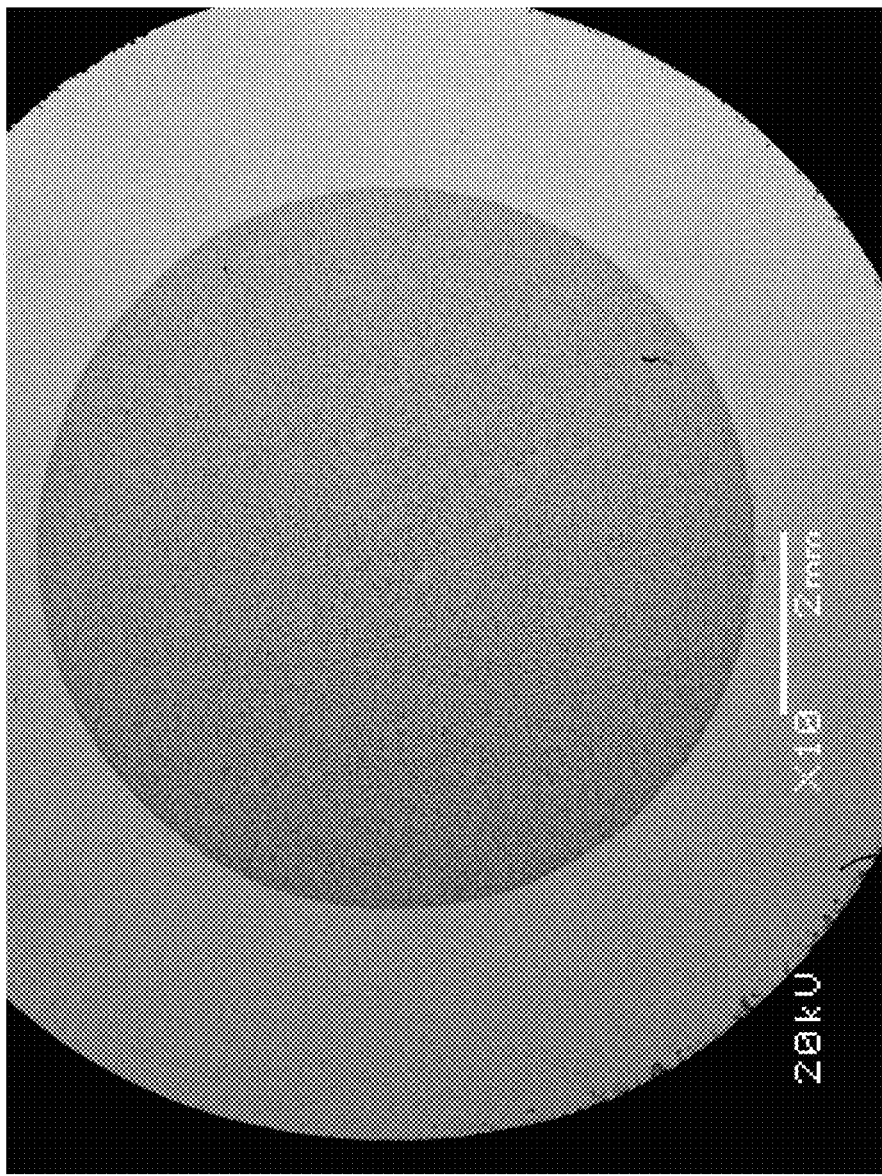
FIG. 1 is a scanning electron micrograph ("SEM") showing the sintered interface of a TCHP-FGM concentric article.
Figure 2:
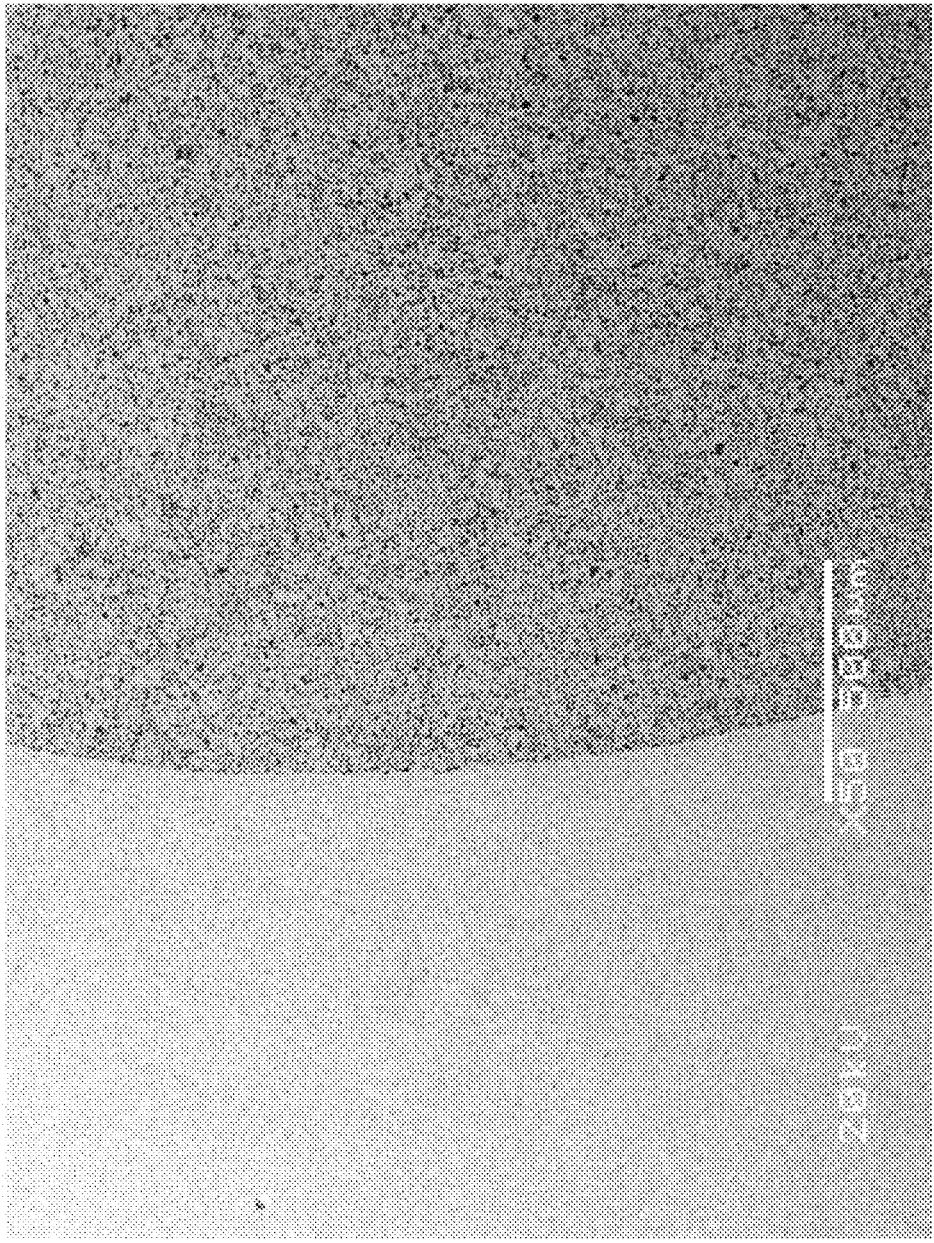
FIG. 2 is an SEM showing the sintered interface of a TCHP-FGM article.
Figure 3:
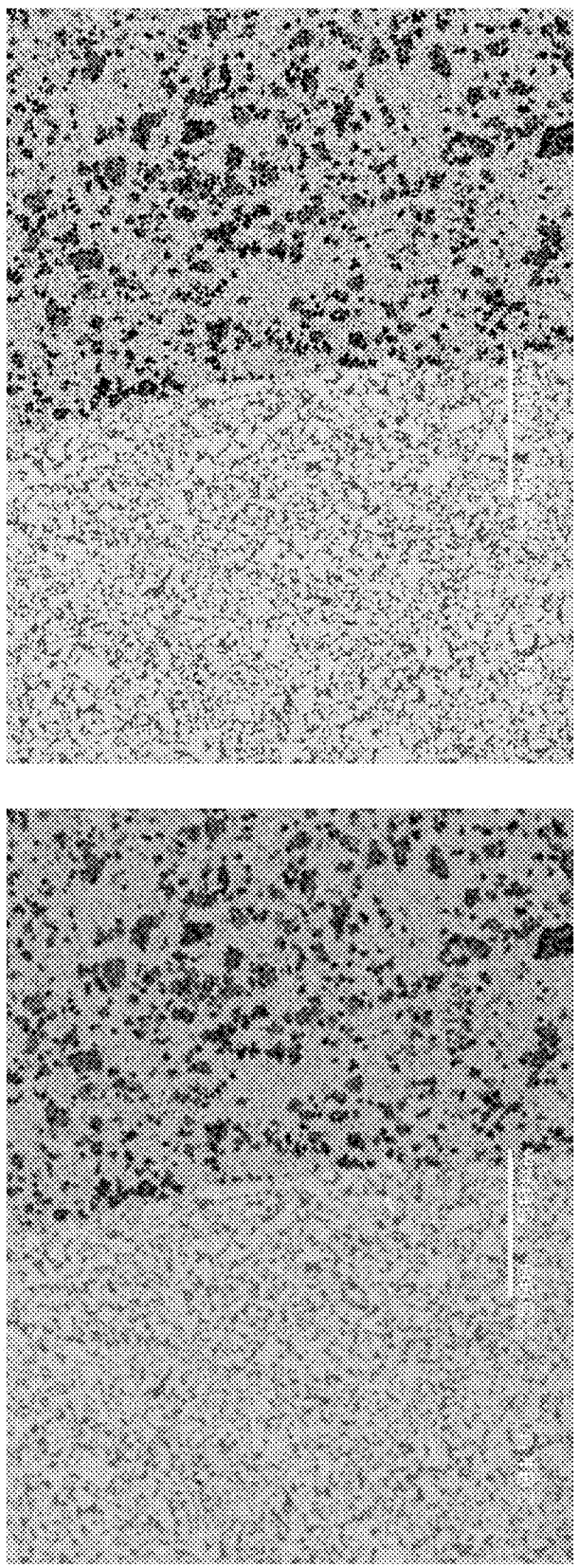
FIG. 3 is (A) an SEM and a (B) backscattered SEM image showing the cross section surface of sintered interface of a TCHP-FGM article.
Figure 4:
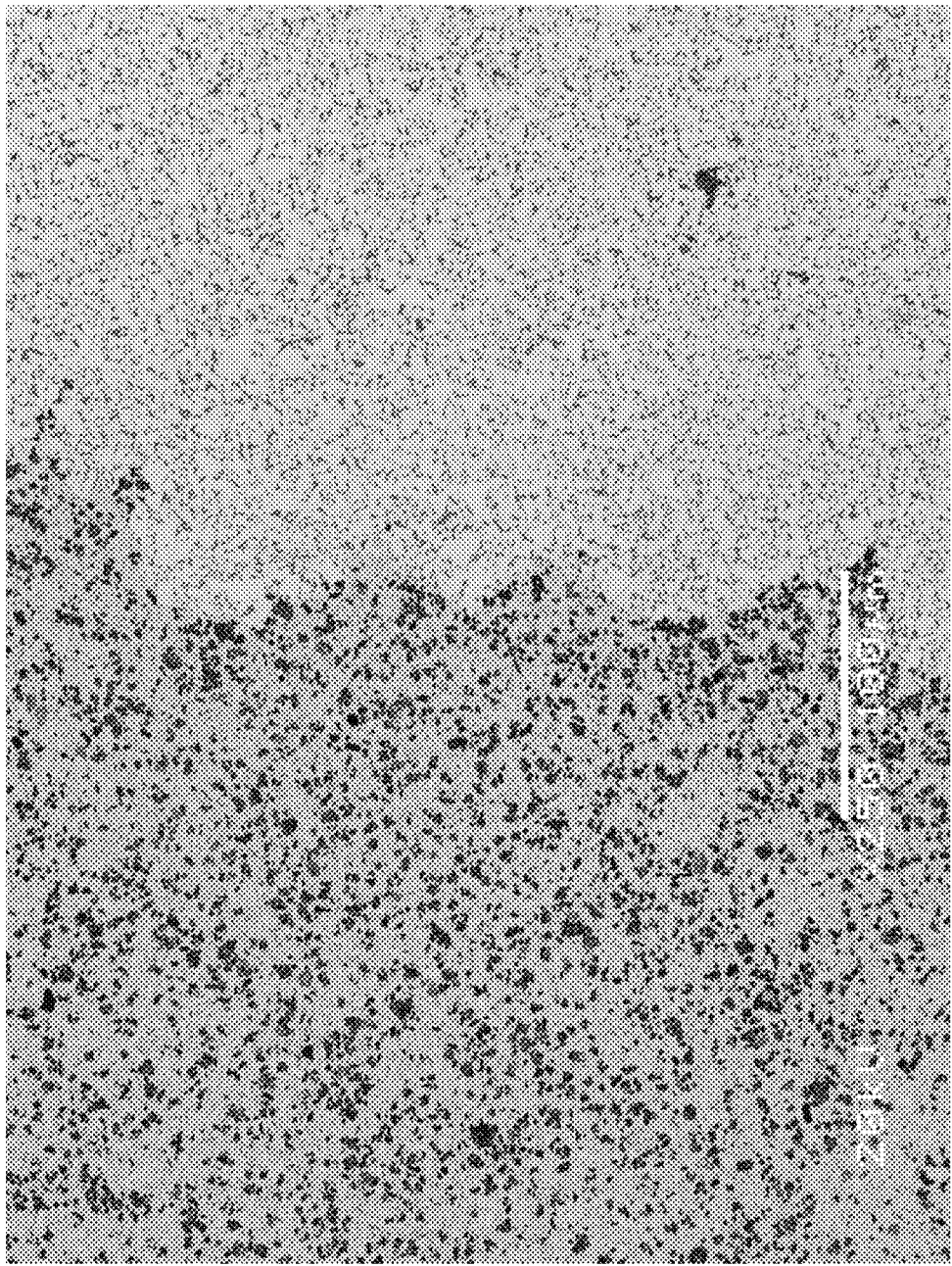
FIG. 4 is a scanning electron micrograph ("SEM") showing the sintered interface of a TCHP concentric article.

Reference will now be made in detail to the present embodiment of the invention.

Definitions

As used herein, "functionally graded material," which is also referred to herein as FGM, means a material that is characterized by a variation in composition and/or structure over volume, resulting in corresponding changes in the properties of the material. In one embodiment, the changes in composition and/or structure over volume in the FGM material is gradual. In another embodiment, the changes in composition and/or structure may be sudden showing discrete interfaces between compositions and structures. In another embodiment, FGM may include changes in physical properties across an article with relatively discrete interfaces between materials. In other words, an FGM material according to the present disclosure includes any article having variations in composition from one end to the other. It is understood that an FGM material according to the present disclosure is typically made by a process in which the entire material is subject to the same processing conditions.

As used herein "NL-3" or versions thereof, refers to a tough coated hard particle (TCHP) having the following composition: Aluminum Oxide 7.3 wt %; Tungsten Carbide: 82.8 wt %; and Cobalt: 9.9 wt %. It typically has the following Physical Properties: Hardness, Rockwell, HRA (ASTM B294) 92.5-92.8; Vickers, HV30 (ASTM E384) 1700-1750; Fracture Toughness, MPa/m (ISO 28079) 12.5-13.5; and a Density, g/cm$^3$ (ASTM B311) 12.4-12.5. The material has a uniform microstructure that is created through encapsulation of fine $Al_2O_3$ particles into a WC shell, and subsequent Co shell.

As used herein "TL-3" or versions thereof, refers to a tough coated hard particle (TCHP) having the following composition: Titanium Carbonitride 7.3 wt %; Tungsten Carbide: 82.8 wt %; Cobalt: 9.9 wt %. It typically has the following Physical Properties: Hardness, Rockwell, HRA (ASTM B294) 92.7-92.9; Vickers, HV30 (ASTM E384) 1770-1790; Fracture Toughness, MPa/m (ISO 28079) 11.0-11.5; and a Density, g/cm3 (ASTM B311) 12.75-12.85. The uniformly distributed Ti(C,N) particles provide increased thermal conductivity when compared to conventional WC—Co materials. The TCHP coating process eliminates the standard core-rim cermet structure by completely encapsulating each Ti(C,N) particle in order to protect them during consolidation.

As used herein, the term "plastic powder," or variations thereof (e.g., "plasticized powder"), means that the powder has been mixed with an additive that improves handling and/or processing properties, such as flow, viscosity and compaction properties of the powder. Non-limiting examples of such additives include paraffin waxes, stearic acid, ethylene bis-stearamide (EBS), polyvinyl alcohol, polyethylene glycol, and co-polymers. As one skilled in the art would appreciate, the additive is burned out during processing and does not remain in the finished sintered article.

As used herein, the term "support region," or variations thereof (e.g., "support face"), is meant to include the part of the article that is not performing the work of the article. For example, in a cutting tool, the support region is not performing the cutting. In a wire die, the support region is not in contact with the wire that is being drawn.

As used herein, the term "support powder" is used to describe the powder that will eventually form the "support region," in the sintered article. Typically, the support powder comprises a carbide material, such as WC—Co.

As used herein, the term "working region," or variations thereof (e.g., "working face"), is meant to include the part of the article that is performing the work of the article. In some instances, the working region or working face can be on the exterior of the article. For example, in a cutting tool, such as a drill bit, the working region is the outer surface performing the cutting. In other embodiments, the working region or working face may in the interior of the article. For example, in a wire die, the working region is the interior of the die extruding the wire, thus in direct contact with the wire. The first composition, which typically comprises the TCHP powder, will generally comprise the working region in the sintered article, whether located on the interior or exterior of the sintered article.

One aspect of the present disclosure relates to consolidated materials composed of tough coated hard particles ("TCHP") dispersed in a tough matrix material.

As used herein, the term "consolidated material" means a material that has been subject to a shaping and/or compression process, optionally in combination with a thermal treatment process for creating a solid or substantially solid article. In some embodiments of the present disclosure, the optional thermal treatment process includes, e.g., sintering and/or cladding. The optional thermal treatment process may be performed in conjunction with the compression process, or subsequent to the compression process.

In some embodiments, a consolidated material is produced by a multi-step process. For example, the components of the material may be first shaped by a process such as compaction, tape casting, slurry casting, or other similar process, and then thermally processed (e.g., by sintering and/or cladding) to form a solid or substantially solid article. In some embodiments, the shaping and thermal treatment processes are performed at substantially the same time, e.g., via hot isostatic pressing, hot pressing, electron beam rapid prototyping, extrusion and/or rolling.

TCHP particles suitable for use in the present disclosure may be provided, for example, in the form of a powder that includes a plurality of core particles that are individually coated with at least one intermediate layer. An optional outer layer, e.g., comprising at least one of Fe, Co, and Ni, may be present on the at least one intermediate layer. The core particles and layer materials are intended to impart their physical properties to the overall TCHP particle.

In some embodiments, the core particles include at least one first compound chosen from metal materials of the formula $M_aX_b$, where M represents at least one of titanium, zirconium, hafnium, vanadium, niobium, tantalum, chromium, molybdenum, tungsten, aluminum, magnesium, and silicon, X represents at least one of nitrogen, carbon, boron, oxygen, and sulfur, and a and b are numbers greater than zero up to and including fourteen. In addition to such metallic materials, the at least one first compound may be chosen from non-metallic materials such as cubic boron nitride (cBN), hexagonal boron nitride (hBN), and diamond. As used herein, the term "compound" is not limited to a material formed of two elements, and thus can also refer to the diamond form of carbon.

One of ordinary skill in the art will understand that in crystalline materials, individual atoms in a unit cell may be shared with adjacent unit cells. Accordingly, in the formula $M_aX_b$, subscripts "a" and "b" may be chosen from whole numbers or non-whole numbers ranging from greater than 0 to 14. In some embodiments, subscripts "a" and "b" are chosen from whole numbers ranging from greater than 0 to 14.

In some embodiments of the present disclosure, the core particles may include at least one core material chosen from diamond, cubic boron nitride, and/or at least one first compound including at least one primary element compounded with at least one secondary element. The at least one primary element is chosen from titanium, zirconium, hafnium, vanadium, niobium, tantalum, chromium, molybdenum, tungsten, aluminum, magnesium, and silicon, and the at least one secondary element is chosen from nitrogen, carbon, boron, sulfur and oxygen.

In general, the core particle materials (first compound) are hard (i.e., they exhibit relatively high Vickers hardness) and can exhibit certain other useful properties, such as wear resistance and chemical resistance to most environments and work pieces. However, these materials often have limited fracture toughness (the ability to arrest a propagating crack).

Of course, other metallic and nonmetallic compounds may also be used as core particles in accordance with the present disclosure. For example, in some embodiments of the present disclosure the at least one first compound consists essentially of at least one stoichiometric compound. Further, the individual core particles of the TCHP powder may, for example, be formed from different first compound materials. Similarly, the individual core particles may be formed from a mixture of first compound materials. In any case, the general purpose is to impart the properties of the various core particle materials to the articles formed therefrom.

As examples of first compound materials which may be suitably used for the core of the TCHP disclosed herein, non-limiting mention is made of $AlB_2$, $Al_4C_3$, $AlN$, $Al_2O_3$, $AlMgB_{14}$, $B_4C$, cubic boron nitride (cBN), hexagonal boron nitride (hBN), $CrB_2$, $Cr_3C_2$, $Cr_2O_3$, diamond, $HfB_2$, $HfC$, $HfN$, $Hf(C,N)$, $MoB_2$, $Mo_2B_5$, $Mo_2C$, $MoS_2$, $MoSi_2$, $NbB_2$, $NbC$, $NbN$, $Nb(C,N)$, $SiB_4$, $SiB_6$, $SiC$, $Si_3N_4$, $SiAlCB$, $TaB_2$, $TaC$, $TaN$, $Ta(C,N)$, $TiB_2$, $TiC$, $TiN$, $Ti(C,N)$, $VB_2$, $VC$, $VN$, $V(C,N)$, $WB$, $WB_2$, $W_2B_5$, $WC$, $W_2C$, $WS_2$, $ZrB_2$, $ZrC$, $ZrN$, $Zr(C,N)$, $ZrO_2$, and mixtures and alloys thereof. In particular, non-limiting mention is made of first compounds consisting essentially of diamond, cubic boron nitride, $Al_2O_3$, $B_4C$, $HfB_2$, $MoS_2$, $SiC$, $Si_3N_4$, $TiC$, $Ti(C,N)$, $WS_2$, and mixtures a alloys thereof.

As used herein, "chosen from" or "selected from" refers to the selection of individual components or the combination of two (or more) components. For example, X in the formula $M_aX_b$ may comprise only one of nitrogen, carbon, boron, oxygen, and sulfur, or it may comprise a mixture of any or all of these components.

The at least one intermediate layer may be applied to all or a portion of the exterior surface of the core particles. In some embodiments of the present disclosure, the at least one intermediate layer is applied to the exterior surface of substantially each core particle. The at least one intermediate layer may be formed, for example, from at least one second compound different in composition from the at least one first compound of the core. In some embodiments, the at least one second compound is formed from a material having higher relative fracture toughness than the at least one first compound of the core. The at least one second compound may also be capable of bonding with the at least one first compound and/or a matrix material (described below).

In some embodiments of the present disclosure, the at least one second compound includes at least one of $B_4C$, W, WC, $W_2C$, SiC, $Si_3N_4$, $TiB_2$, $Ti(C,N)$, either alone or in combination with another element or material. For example, the at least one second compound may consist essentially of W, WC, and/or $W_2C$, optionally in combination with Co. In some embodiments, the at least one second compound consists essentially of W, WC, and/or $W_2C$, in combination with less than about 20 weight % Co, such as less than about 15 weight % Co, or even less than about 10 weight % Co. Of course, the at least one intermediate layer may contain more or less Co than described above. Further, the amount of Co in the at least one intermediate layer may vary incrementally within the aforementioned ranges.

The TCHP particles may have any shape, e.g., blocky, square, rectangular, ellipsoidal, spherical, flake, whisker, platelet, or they may be irregular. In some embodiments of the present disclosure, the TCHP particles are substantially spherical. In still other embodiments of the present disclosure, the TCHP particles are irregularly shaped. For example, the shape of the TCHP particles may be selected to suit a particular application, e.g., wire drawing (substantially spherical) and metal cutting/shaping (irregular/jagged).

The individual TCHP particles in accordance with the present disclosure may also include an optional outer layer of a material surrounding or substantially surrounding the intermediate layer. This optional outer layer may include, for example, a metal such as Co, Fe, Ni, and mixtures, alloys, and intermetallic compounds thereof.

The consolidated materials described herein also include a matrix that surrounds or substantially surrounds each of the TCHP particles. The matrix is formed from at least one third compound, which in some embodiments has a relatively high fracture toughness relative to the core particles. For example, the matrix may comprise a mixture of first and second particles, wherein the first particles include at least one of tungsten and tungsten carbide (e.g., WC and/or $W_2C$) and the second particles include Co. Alternatively, or in addition to the mixture of first and second particles, the matrix may comprise an alloy of at least one or tungsten and tungsten carbide with Co. Regardless, the amount of Co in the at least one third compound may range, for example, from greater than 0 to about 20 weight % Co or more, such as from about 5 to about 20 weight %, from about 8 to about 15 weight %, or even about 10 to about 12 weight %. Of course, the amount of Co in the at least one third compound may be selected to suit a particular application, and may vary incrementally within the aforementioned ranges. Further, the total amount of Co in the at least one third compound may be higher than 20 weight %.

In some embodiments, the amount of Co in the at least one third compound (matrix) is greater than the amount of Co in the at least one second compound (intermediate layer). For example, the at least one second compound may comprise from greater than 0 to about 5 weight % of Co, and the at least one third compound may comprise from about 10 to about 15 weight % of Co. Similarly, any other amount of Co within the ranges previously described for the intermediate layer and binder may be used, provided that the matrix contains more Co than the intermediate layer. By virtue of the increased Co content, the at least one third compound (matrix) may exhibit higher toughness properties, relative to the at least one second compound (intermediate layer).

In some embodiments, the consolidated materials of the present disclosure comprise sintered TCHP particles with a core comprising at least one first compound described above. In these embodiments, at least one intermediate layer is present on substantially each core, and comprises or consists essentially of W, WC, and/or $W_2C$, optionally in combination with Co. Further, matrix of at least one third material of a matrix contains or substantially contains the TCHP particles, and comprises or consists essentially of a mixture of W, WC, and/or $W_2C$ with greater than 0 to about 20 weight % of Co. For example, the at least one second compound may consist essentially of a mixture of WC or $W_2C$ with 5-10 weight % of Co, and the at least one third compound may consist essentially of a mixture of WC and/or $W_2C$ with greater than 10 weight % of Co, e.g., from greater than 10 to about 20 weight % Co or even from about 15 to about 20 weight % Co.

The TCHP described herein may be manufactured by any suitable method. For example, the TCHP may be manufactured by providing a plurality of core particles, wherein the core particles are formed from at least one first compound described previously, and providing at least one intermediate layer around a majority of the plurality of core particles, the intermediate layer being formed from at least one second compound described previously.

The at least one intermediate layer may be provided on the core particles by any suitable deposition method. For example, the at least one intermediate layer may be deposited on the core particles via at least one method chosen from chemical vapor deposition, physical vapor deposition, plasma deposition and/or cladding, laser deposition and/or cladding, magnetic plasma deposition, electrochemical deposition, electroless deposition, sputtering, solid phase synthesis, solution chemistry deposition processes, and combinations thereof. For additional non-limiting examples of suitable processes for forming the intermediate layers, reference is made to the processes disclosed in U.S. Pat. No. 6,372,346, and U.S. Pre-Grant Publication No. 2005/0275143, which are incorporated herein by reference.

The particles of matrix material may comprise at least one third compound described previously, or a precursor thereof. For example, the particles of matrix material may include a mixture of first particles and second particles, the first particles comprising at least one of W, WC, and $W_2C$ and the second particles comprising Co. Alternatively, or in addition to the mixture of first and second particles, the matrix may comprise an alloy of at least one of W, WC, $W_2C$ with Co. Similarly, the matrix powder may comprise a precursor material which, upon sintering, cladding and/or other processing, results in a mixture of W, WC, and/or $W_2C$ with a desired amount of Co. In some embodiments, the amount of Co in the matrix ranges from greater than 0 to about 20 weight %.

The TCHP and matrix particles may be mixed using known mixing apparatuses or methods. For example, the TCHP and particles of matrix may be mixed via ball milling, attritor milling, or mechanical stirring. Of course, other mixing methods may be used.

The mixed powder may, for example, contain a uniform (homogenous), substantially uniform, or nonuniform (heterogeneous) distribution of matrix particles and TCHP. In a non-limiting embodiment, the mixed powder is composed of a uniform or substantially uniform distribution of TCHP and matrix particles.

Any known method for shaping a particulate material into an article may be used in the methods according to the present disclosure. For example, the mixed powder may be shaped into an article by molding. Further, the mixed powder may be formed into a so-called "green" article by compacting or shaping the blended powder at a temperature lower than the sintering temperature of the powder. For example, an article may be formed by cold pressing (e.g., cold isostatic pressing), wherein sufficient external pressure is applied to the powder to form a "green" article. Alternatively, an article may be preformed by hot pressing (e.g., hot isostatic pressing), wherein external pressure is applied to a powder while the powder is heated to a temperature above, below, or around the sintering temperature. Other non-limiting methods of shaping include the mixed powder of the present disclosure include powder injection molding, plastified extrusion, high pressure transmission media, and rapid prototyping.

Fugitive binders may be added to the mixed powder to add green strength to the shaped articles described herein. Non limiting examples of such fugitive binders include paraffin waxes, stearic acid, ethylene bis-stearamide (EBS), plasticizers (e.g., polyvinyl alcohol, polyethylene glycol, and/or synthetic resins), and similar organic compounds. An example of a commercially available fugitive binder is Acrawax. The fugitive binders may be added, for example, in an amount of about 2% by weight. The fugitive binder may be burned off during a later step, such as during a sintering step.

Lubricants may be added to the mixed powder to aid in the formation of a shaped article. For example, where the mixed powder of the present disclosure includes TCHP that are irregularly shaped, lubricants may be added to aid in their compaction and shaping, since the TCHP are not rounded off by dissolution.

In addition, some TCHP particles undergo reactive processes upon contact with oxygen and/or moisture. Thus, a protective coating, such as a polymeric or inert oxide coating, may be applied to the TCHP particles to prevent such processes from occurring.

Figure 6:
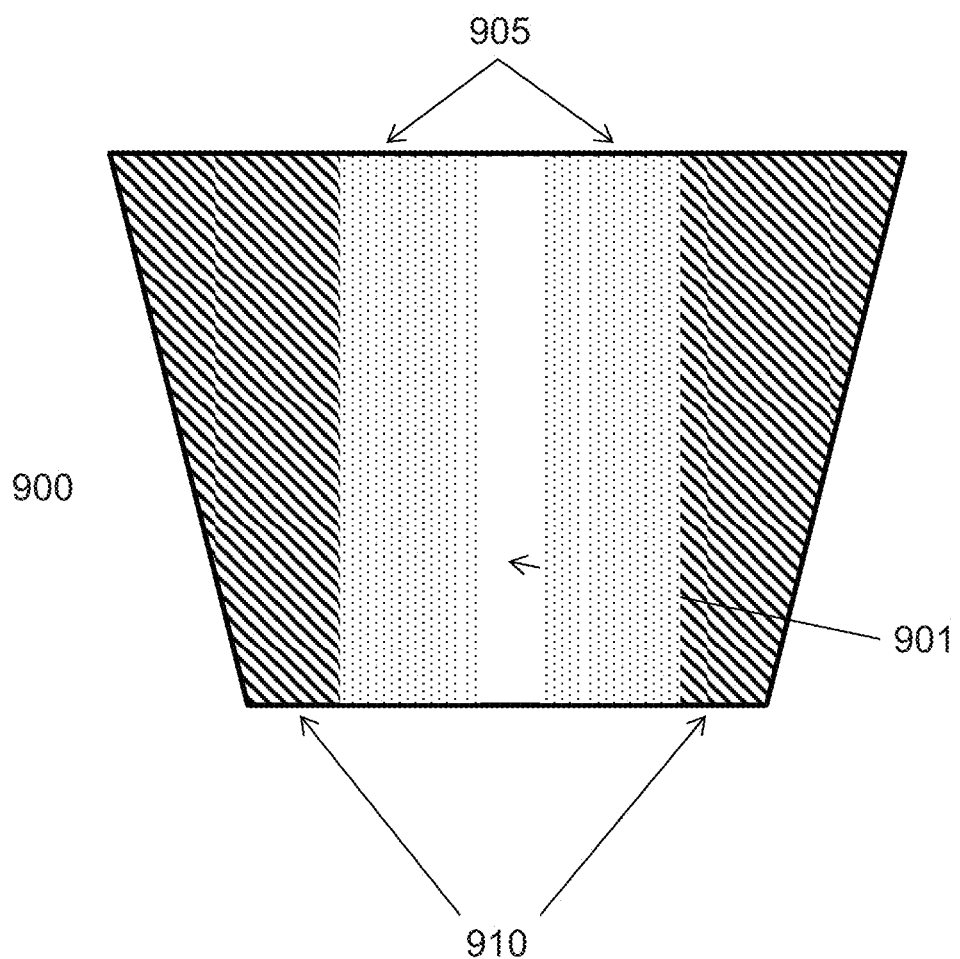
FIG. 6 is a schematic of a wire die (in cross section) made according to the present disclosure.

Referring to FIG. 6, there is shown a wire die (900), in cross-section, made according to the present disclosure. As shown, the orifice for pulling the wire (901), is surrounded by the working region (905), which may comprise a TCHP powder, as disclosed herein. For example, in one embodiment, this working region includes a plurality of core particle comprising a compound selected from the group consisting of: TiN, Ti(C,N), TiC, TiB, ZrC, ZrN, VC, VN, cBN, $Al_2O_3$, $Si_3N_4$, $SiB_6$, SiAlCB, $W_2B_6$, AlN, $AlMgB_{14}$, $MoS_2$, $MoSi_2$, $Mo_2B_5$, $Mo_2B$, MoFeB (iron molybdenum boride), and diamond; an intermediate layer on said core particles, the intermediate layer comprising at least one compound selected from WC, $W_2C$, tool steel, glassy and devitrified nanosteel alloys, silicon nitride, and tantalum carbide; and an outer layer located on the intermediate layer which comprises Co, Fe, Ni, or combinations thereof. Adjacent to the working region is the support region (910). In one embodiment, the working region comprises a carbide material, such as a WC—Co.

As used herein the phrase "additive manufacturing processes," or variations thereof refers to a process of making three dimensional (3D) solid objects from a digital model. As a result, it is sometimes referred to as "3D printing" and is achieved using additive processes, where an object is created by laying down successive layers of material. In one embodiment, the additive manufacturing process used herein comprises a laser to sinter media and form a solid, such as selective laser sintering (SLS), or direct metal laser sintering (DMLS).

The TCHP family of materials described herein offers advancements in mechanical properties that, relative to conventional materials, provide much higher performance in industrial applications such as wire drawing, metal cutting, etc. This work describes recent novel developments that have been conceived and demonstrated for creating functionally graded structures consisting of unique TCHPs and carefully selected support materials, such as certain WC—Co powders, to promote additional enhancements in performance through improved efficiency and productivity.

These new TCHP-FGM materials have been created by pressing and co-sintering recently developed TCHP powders with carefully chosen WC—Co powders to produce functionally graded materials (FGM) with properties required for high performance such as high abrasion resistance, high strength, and high thermal tolerance, among other desired properties consistent with those offered by TCHP materials.

TCHP materials can tolerate high thermal and abrasive environments which exist in many industrial operations whereas typical WC—Co materials are inadequate for demanding applications. The high value provided by TCHP materials is realized principally by their longer operational life and improved qualities of some work-pieces such as wire drawn with TCHP dies; however the portion of the part that delivers the value is the "working surface". Substituting "non-working" portions of the part with typical WC—Co powder can lower cost and in some parts, also convey improved properties to the TCHP.

One non-limiting example of a part intended for such an application is an advanced TCHP-FGM wire drawing die. In this embodiment, the architecture is designed such that a high hardness "working" face (e.g., interior of a wire die or the exterior of a cutting tool insert) comprised of TCHP with carefully selected external "support" material(s). The chief function of the external WC—Co component is to impart compressive stress on the TCHP and restrict its enlargement caused by thermal expansion during working operations (dispersion of heat generated during working operations can also be managed by designing the thermal conductivities of the FGM).

In contrast to previously published attempts to sinter FGMs solely using two different WC—Co powder compositions, where the two WC—Co materials diffuse into one another and two microstructures are no longer sufficiently distinct, no substantial dilution between TCHP and WC—Co has been observed.

Cobalt migration between the different components of this type of TCHP-FGM is minimized, whereas it is well known that there is sometimes undesirable migration of cobalt in many attempts to sinter WC—Co FGMs. Furthermore, the limitation of WC—Co FGMs is overcome in that WC grain growth is not observed.

As a result, it has been shown that at least the following benefits associated with the disclosed TCHP-FGM articles and methods are possible:

Strong chemical bonding between diverse powders while maintaining discrete FGM structure Minimized cobalt migration; no WC grain growth (technical issues that plague WC—Co FGM)

Induce intentionally designed compressive stress in sintered part for increased wear resistance Manage or disperse heat generated during operation by appropriate design of TCHP-FGM Variety of TCHP-FGM parts—wire dies, rods for drill tools, co-sintered tool tips, etc.

In accordance with the invention an article is formed from at least two different powders, at least one of which is a first powder, comprised of a plurality of core particles consisting essentially of an essentially stoichiometric first metal compound having the previously described formula $M_aX_b$. In various embodiments, this first powder comprising the first plastic mixture, the first metal compound is predominantly stoichiometric and consists essentially of a metal compound selected from the group consisting of: TiN, Ti(C,N), TiC, $TiB_2$, ZrC, ZrN, $ZrB_2$, VC, VN, cBN, $Al_2O_3$, $Si_3N_4$, $SiB_6$, SiAlCB, $W_2B_6$, AlN, $AlMgB_{14}$, $MoS_2$, $MoSi_2$, $Mo_2B_5$, $Mo_2B$, MoFeB (iron molybdenum boride), and diamond. Such metal compounds are hard, or have certain other useful mechanical properties, but have limited fracture toughness. In addition to the previously listed compounds, other metal compounds may be operable with the present invention.

The previously described core particles are coated with an intermediate material consisting essentially of a second metal compound, i.e., one different in composition from the first metal compound forming the core of the particle. The compound of the intermediate layer generally has higher relative fracture toughness than the material forming the core. In addition, the second metal compound must be capable of bonding with the first metal compound and be capable of bonding with iron, cobalt, nickel, copper, titanium, aluminum, magnesium, lithium, beryllium, silver, gold, and platinum, their mixtures, their alloys or their intermetallic compounds.

In the first powder comprising the first mixture, the second metal compound consists essentially of WC—Co. As will be disclosed below, the combination of a relatively tough and strong intermediate layer and a hard core provide a sintered material formed therefrom with exceptional mechanical properties. The coated particles generally have an average particle size of less than about 2 micrometers and even less than about 1 micrometer. The intermediate layer typically has a thickness in the range of from 5% to 50%, such as 10% to 25% of the diameter of the core particles.

To the extent that the article or component part is a tool for shaping or cutting metal it is comprised of a sintered material containing the said first powder, its wear and friction properties are principally a function of the properties of the core particles, their concentration in the sintered material, and their combinations. The fracture toughness is a function of the amount of WC—Co or steel or other structural matrix, the percent of cobalt (if present), and the density of the sintered matrix.

In an embodiment where the article is a cutting insert and the core particles are TiN and the intermediate layer is WC, the coefficient of friction of the TiN, its hardness and resistance to wear impart those properties to the cutting insert while the overall strength of the insert and its resistance to crack propagation are enhanced by the WC layer surrounding the Ti(C,N) core particles. Significantly, wear of the insert will not result in the diminution of the characteristics of such an insert because the Ti(C,N) is not an external coating to be worn off. It is an integral part of the insert material that renews the surface as it is worn.

The first powder comprising the first mixture may further include an outer layer overlaying the intermediate layer on the coated particles. The function of the outer layer is to join the coated particles at reasonable sintering times and temperatures into a dense sintered material. As here embodied the outer layer functions as a binder. It may be comprised of iron, cobalt, nickel, their mixtures, their alloys or their intermetallic compounds. Generally, such binders are a uniform coating on the exterior of the metal compound particles in the form of a substantially continuous layer. The powders used with the present invention are disclosed in U.S. Pat. No. 6,372,346, which is herein incorporated by reference in its entirety. Particular powders that can be used in the present disclosure include diamond, cBN and Ti(C,N).

In another embodiment the first metal compound in the second powder as well as the second metal compound in the second powder is WC or $W_2C$ and the binder is Co. In such an embodiment the first powder forms cemented tungsten carbide. In a preferred embodiment the second power is comprised of WC particles coated with a binder layer of Co. The wt % of Co may range from about 3 to about 25 percent. Alternatively, the second powder may consist of a mixture of WC and Co, where the Co comprises between 3 and 25 percent.

In accordance with the invention, there is provided a method of making an article such as a mechanical component or a tool for shaping metal.

The first mixture or powder mixture is disposed to form (after extrusion, injection, calendering, or powder layering; shaping; compacting; and sintering) a tool or component material having a hardness and low friction coefficient on working surfaces and edges that yield reduced heat, wear, and cratering, and require less processing power and auxiliary use of external lubricants, ultimately resulting in longer tool life, better process control, and reduced environmental impact. Such a material provides a low reactivity with iron-based work pieces, reducing sticking and diffusion, flank, or die wear, and in turn extending the service life of a drawing die made from such material. In addition, the tough, strong intermediate coating material (e.g., WC—Co) on the core particles forms a cellular support macrostructure for the article while, at the same time, providing a perfectly-fitting and tightly-bound protective layer for the hard core particles (of, for example, TiN or $B_4C$), holding them in position and permitting optimal exposure and hard phase retention at the wear-resistant surface.

The method further comprises forming a second mixture or powder mixture of a second powder. The second mixture or powder mixture is disposed to form a higher strength and fracture toughness than the material formed from the first powder mixture and is designed to form a structural support for an article (after shaping, assembly with the first mixture, compacting, and sintering). This provides a major added value in the powder injection molding and extrusion art because the material forming the primary coated or uncoated powder or the intermediate layer on the powder of the second mixture can be matched in composition with the intermediate layer on the powder of the first powder mixture and the binder materials for both powder mixtures can be the same and in the same weight fractions. This allows articles made from both mixtures to intimately bond with the highest possible strength after assembly, compaction, and sintering.

The two powder mixtures are formed together into a green body such that the first mixture forms a first portion of the green body with the second mixture forming a second portion of the green body. An exemplary method for achieving this is powder injection molding. Other examples are powder extrusion, powder calendering, tape casting and powder layering.

The two mixtures are formed together into a green body such that the first mixture forms a first wear-resistant portion or portions of the green body with the second mixture forming a second portion of the green body which provides high fracture toughness. The two powder mixtures are intimately assembled together in the green state by virtue of the extrusion, injection, calendering, or powder layering processes. This allows the common or compatible contiguous matrix of the two powder materials, each of which may be plasticized, to bond together more strongly than with conventional FGMs, coating, or lamination practices. This is further aided by the pressure exerted on the green surfaces by the extrusion, injection, calendering, or powder layering (molding) processes. The pressure required on a given powder mixture with respect to the other powder mixture depends on the relative viscosities of the two. Greater pressure is generally required on the powder mixture having a relatively higher viscosity, when the thickness of that layer with respect to the other must be increased, or when the die profile or flow cavity is more complex.

The assembled FGM green body is compacted (such as by cold isostatic pressing) to form a compact. The compact is then heated to remove the polymeric binder material and then sintered to form an article such as a tool having portions of different properties, the first portion of the green body forming a hard and wear resistant cutting portion of the tool and the second portion of the green body forming a tough, strong load bearing portion of the tool. The thickness of the wear resistant portion(s) may be increased or decreased to provide for the anticipated wear or to provide greater or fewer regrinds and reuses of the part.

The shaped blank (also referred to as a "green body") is compacted to form a compact. Compaction gives increased strength, density, shape definition, and dimensional control. Conventional uniaxial green (unsintered) powder compaction is generally performed with pressure applied by hard upper and lower punches along one axis of the part. The die cavity into which the powder, such as a plasticized powder or blank, is pressed provides lateral constraint and shape to the powder as it is compressed. After filling the cavity, the punches are loaded to generate compressive stress in the range of 20,000-30,000 psi on the powder. More complicated parts are covered with rubber coatings and isostatically compressed in a hydraulic pressure transmitting medium. This produces a cold consolidation, after which the compact must be removed from the die by the movement of the punches.

During green consolidation, the compaction forces create interparticulate bonds that provide the green strength that holds the part in shape in preparation for sintering. Wetting liquids and waxes can also be added to the particulate matter to increase bond strength. Pressing the powder before sintering reduces the porosity in the powder so that less shrinkage occurs during sintering. The main objective in compaction is to achieve sufficient green strength properties to maintain the compact part geometry prior to and during sintering but with minimal wall friction.

Powder injection molding is based on the principle of plastic injection molding and yields parts of low cost and high shape complexity. The key steps of injection molding are premixing, mixing and pelletizing, injection or extrusion molding, solvent debinding and removal, thermal debinding and pre sintering, and finally, sintering. The binders used are thermoplastic mixtures of waxes, polymers, oils, lubricants, and surfactants. The polymer imparts viscous flow characteristics to the powder mixture to aid flow, forming, die filling, and uniform packing. Binders are typically composed of 70% of paraffin wax and 30% polypropylene with appropriate lubricants or wetting agents to provide binder adhesion to the powder as well as flowability. The amount of the binder is about 40 volume percent of the mixture and is usually fluid at about 150° C. The injection molding involves concurrent heating and pressurization of the feedstock by an injection mechanism, extruder, or calender. The mixture is heated in the extruder, injection machine, or calender to temperatures in the range of 130° C. to 190° C. The powder is injected into the cavity by a forward thrust of the screw or a ram in the barrel to inject a preset volume of molten feedstock into the die. Alternatively, the flat or calendered feedstock may be cut and transferred into the mold cavity to maintain its laminar characteristics.

Powder layering is accomplished by sequential and sometimes concurrent delivery to compaction molds of essentially dry constituent powders identical with those of the previous processes but without the aid of plastic extruders, injectors, or calenders. Polymeric binders are used, not to plasticizer the mix, but to aid in molding compaction and in demolding of the parts. In this manner of blending and transitioning the constituent particles at the interface in addition to molded grooves, superior transition zone strength can be achieved than with any other method.

The compact is then sintered to form an article or a tool or a tool preform that can be further shaped to form the final tool. The sintering of these FGM laminar compacts is a thermal process creating interparticulate welds which greatly improve the properties of the green part. This bonding together of the particles occurs as cohesive necks grow at the particle points of contact at high temperatures, which can occur below the melting point of a binder material. The particles sinter together by atomic motion that eliminates the high surface energy associated with powder. The structural changes during sintering depend on diffusion processes that create material transport mechanisms. As the interparticulate necks grow, the porous structure becomes increasingly interconnected as shrinkage occurs. As densification continues, the interparticulate pores gradually collapse and the material densifies to the range of 92 to 99 percent of theoretical.

In one embodiment, the second powder comprises WC—Co having a particle size ranging from 0.5 to 5.0 micrometers. Upon sintering, this second powder shrinks approximately 15-20%, such as 16-19%.

In some instances pressure is applied to the powder during sintering. Higher compaction pressures increase density. In two phase systems such as with TCHP, it is possible to form a low melting phase where the liquid may provide for rapid transport and rapid sintering. Wetting is the first requirement as the liquid must form a film around the solid phase particles. Once the liquid forms it will flow to wet the particles and as the liquid phase increases, it flows into the interstitial spaces between the particles as capillary forces densify the structure. With continued heating, the solid phase dissolves into the liquid and the amount of liquid grows until it is saturated with the solid component. The liquid phase then becomes a carrier for the solid phase atoms which then nucleate and reprecipitate in the interstitial spaces to densify the product after cooling.

Different atmospheres may be used during sintering to protect it from oxidation and to remove lubricants and binders used in preconsolidation. Such atmospheres may also contribute to the control of carbon in the matrix. Initial density, sintering temperature, sintering time, material, particle size, sintering atmosphere, and heating rate all influence the rate of sintering. As the degree of sintering increases, the hardness, strength, ductility, thermal and electrical conductivity, corrosion resistance, magnetic permeability, and other properties will improve. Dynamic properties such as fatigue and impact toughness are most sensitive to the sintering process.

The blanks can also be consolidated by what is known as liquid phase sintering. Such a process for the materials of the present invention is disclosed in U.S. Pat. No. 7,736,582, which is incorporated by reference herein in its entirety.

In any of the above methods, sintering may be accomplished in an inert, carburizing, decarburizing or reducing, nitrogen, or vacuum atmosphere to aid the sintering process.

It has been shown that the combination of TCHP materials and carefully selected support materials, such as certain WC—Co powders, will promote enhancements in performance through improved efficiency and productivity. A description of the WC—Co Support Powders used in the present disclosure is provided below.

| WC-Co Powder | Average WC Grain Size (um) | Cobalt (wt %) | Sintered Shrinkage (%) |
|---|---|---|---|
| A (ultrafine) | 0.8 | 10.0 | 18.8 |
| B (fine) | 2-3 | 11.0 | 18.2 |
| C (medium) | 3-5 | 15.0 | 16.9 |

Figure 5:
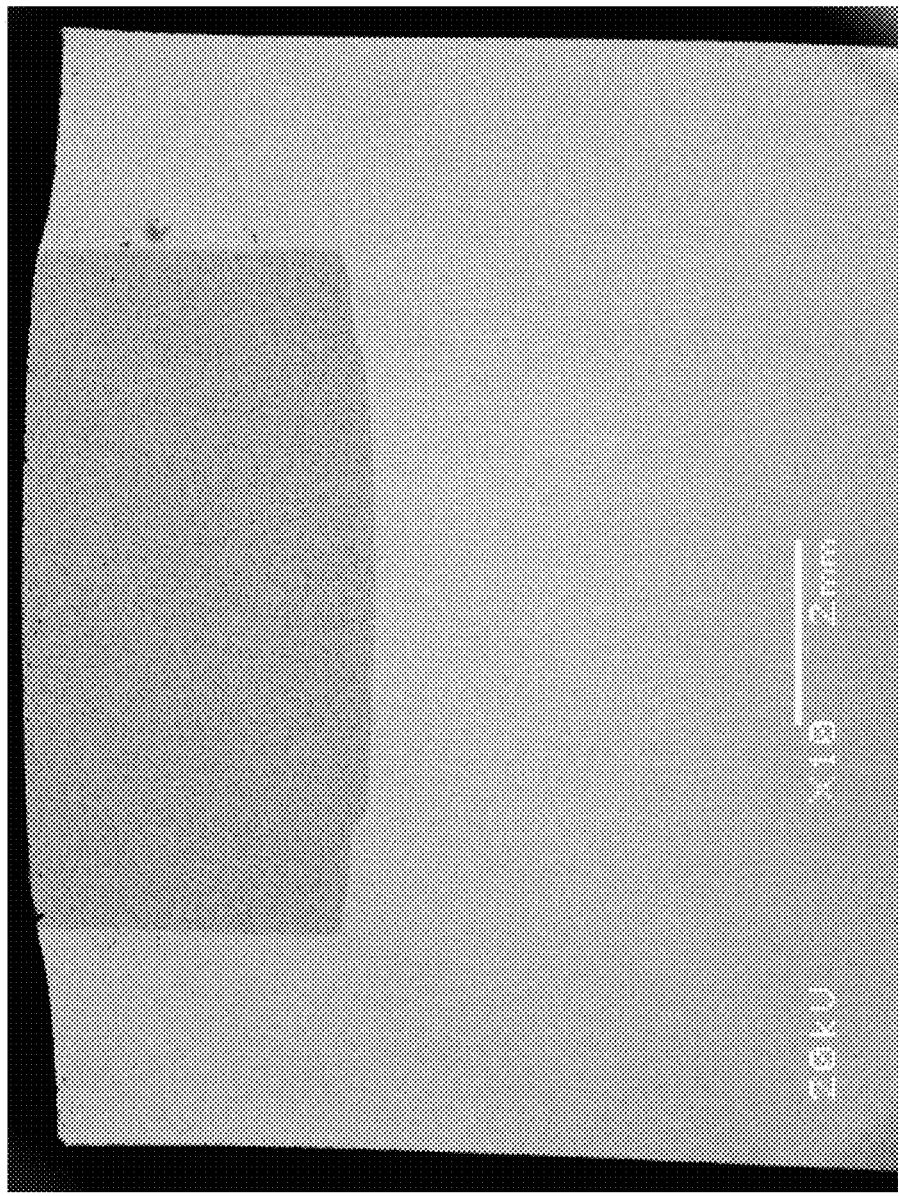
FIG. 5 is a scanning electron micrograph ("SEM") showing a cross section of the sintered interface of a TCHP-FGM article in which the support powder was found to be or this example (wire die part), support C was found to be best, and support A was inadequate.

The TCHP used in this work contains 9.5 wt % cobalt, with a sintered shrinkage of about 16.0%. As a result, the WC—Co powder C (shown above having a sintered shrinkage of 16.9%) more closely matches the TCHP. The other WC—Co powders, which have a higher sintered shrinkage, lead to a finished product having mismatched shrinkages and cracks in the microstructures. FIG. 5 shows such a structure.

A non-limiting example of a typical powder pressing method to produce a TCHP-FGM article from various powders is provided below.

A thin-walled hollow steel tube (outer diameter 0.340") was placed into the center of the cylindrical die tooling set (diameter 0.580") on a conventional powder press to maintain separation during loading of the two distinct powder types (TCHP and WC—Co "support").

Approximately 8 grams of TCHP was placed in the interior of this hollow tube, and approximately 12.5 grams of WC—Co was placed in the die cavity on the outside of the tube.

The hollow tube was then carefully removed to minimize disrupting the powder, and then was conventionally pressed at a pressure of 10-12 TSI (tons sq. in.).

This process was repeated for different WC—Co support powders using the same TCHP grade.

All green parts were placed on a conventional graphite sintering tray and loaded into the sintering furnace.

The green parts were then sintered under the following conditions: Start at room temperature under vacuum.

Ramp to 440° C. at a rate of 5° C./min (with Argon at a partial pressure of about 2 Torr). Hold at 440° C. for 120 minutes (with Argon at a partial pressure of about 2 Torr).

Ramp to 700° C. at a rate of 5° C./min under vacuum. Hold at 700° C. for 60 minutes under vacuum.

Ramp to 1250° C. at a rate of 5° C./min under vacuum. Hold at 1250° C. for 30 minutes under vacuum.

Ramp to 1400° C. at a rate of 5° C./min (with Argon at a partial pressure of 2 Torr). Hold at 1400° C. for 105 minutes (with Argon at a partial pressure of 2 Torr). Cool down with Argon at a partial pressure of 2 Torr for the first hour of the cool down.

All final sintered part weights are about 20 grams (green weights slightly higher, close to 20.5 grams).

An alternative example of a typical powder pressing method used to form a TCHP-FGM article starting with pre-pressed TCHP disks is provided below.

TCHP disks (diameter 0.310" with approximate green weight 3 grams) were first pressed at 10-12 TSI using a conventional powder press, and set aside.

Next a cylindrical die tooling set (diameter 0.580") was inserted into the powder press.

A pressed TCHP disk was placed at the bottom of the die cavity and approximately 12 grams of WC—Co powder was loaded to fill the remaining volume of the die cavity.

The powders were then conventionally pressed together at a pressure of 10-12 TSI.

This process was repeated for different WC—Co support powders using disks pressed from the same TCHP grade. All green parts were placed on a conventional graphite sintering tray and loaded into the sintering furnace.

The green parts were then sintered under the following conditions: Start at room temperature under vacuum.

Ramp to 440° C. at a rate of 5° C./min (with Argon at a partial pressure of about 2 Torr). Hold at 440° C. for 120 minutes (with Argon at a partial pressure of about 2 Torr).

Ramp to 700° C. at a rate of 5° C./min under vacuum. Hold at 700° C. for 60 minutes under vacuum.

Ramp to 1250° C. at a rate of 5° C./min under vacuum. Hold at 1250° C. for 30 minutes under vacuum.

Ramp to 1400° C. at a rate of 5° C./min (with Argon at a partial pressure of 2 Torr). Hold at 1400° C. for 105 minutes (with Argon at a partial pressure of 2 Torr).

Cool down with Argon at a partial pressure of 2 Torr for the first hour of the cool down.

The above described methods can be used to form a sintered article comprising at least two distinct and adjacent compositional regions, wherein a first compositional region performs the work of the tool, such as cutting or extruding, and comprises: a plurality of core particle comprises a compound selected from the group consisting of: TiN, Ti(C,N), TiC, TiB, ZrC, ZrN, VC, VN, cBN, $Al_2O_3$, $Si_3N_4$, $SiB_6$, SiAlCB, $W_2B_5$, AlN, $AlMgB_{14}$, $MoS_2$, $MoSi_2$, $Mo_2B_5$, $Mo_2B$, MoFeB (iron molybdenum boride), and diamond; an intermediate layer on said core particles, said intermediate layer comprising at least one compound selected from WC, $W_2C$, tool steel, glassy and devitrified nanosteel alloys, silicon nitride, and tantalum carbide; and an outer layer located on said intermediate layer which comprises Co, Fe, Ni, or combinations thereof.

In one embodiment, this first composition region or working region comprises 9-10% Co.

The article also comprises a second compositional region that supports the first, working region. In one embodiment, the second composition region comprises a carbide material, such as WC—Co.

The articles described herein are typically cutting or forming articles, such as drills, mills, cutting and forming tools, wire dies, and mechanical components, where the working face comprises substantially the first composition.

Accordingly, the materials according to the present disclosure are well suited for use in a broad array of articles, including but not limited to: tooling, such as drawing dies (e.g., wire drawing dies, composite wire dies, enameling wire drawing dies), extrusion dies, forging dies, cutting and stamping dies, forms, forming rollers, injection molds, shears, drills, milling and lathe cutters, saws, hobs, breaches, reamers, taps, and other dies; individual mechanical parts, such as gears, cams, journals, nozzles, seals, valve seats, pump impellers, capstans, sheaves, bearings, and wear surfaces; integrated co-sintered components to replace mating parts, internal combustion engine rods, bearings, hard surface zones in powdered metal (P/M) processes, mechanical parts substituted for forged or machined steel parts with heat-treated zones (e.g., camshafts, transmission parts, etc.), and printer/copier parts; heavy industrial articles such as deep well drilling bits, teeth for mining and earthmoving equipment, and hot rolls for steel mills; and electromechanical components such as memory drive reading heads and specialized magnets.

The consolidated materials of the present disclosure may also be used, for example, to form components of apparatus, machinery, and other articles used in the cleanup and/or amelioration of radioactive (nuclear) material. In one non-limiting embodiment, the consolidated materials described herein are formed into a plate suitable for use in the cleanup and/or amelioration of nuclear material. In this regard, non-limiting mention is made of a consolidated material comprising a plurality TCHP described previously, wherein the TCHP are clad or plated with nickel prior to being mixed with a matrix material.

The present disclosure is further illustrated by the following non-limiting examples, which are intended to be purely exemplary of the disclosure.

EXAMPLES

The following Examples describe various FGM articles made according to the present disclosure, each having tough coated hard powder (TCHP) in some part. In Example 1, solid FGM rods having a variation in composition from one end of the rod to the other were made and tested. In Example 2, FGM cylinders were made having a variation in composition from inside to outside of the cylinder were made and tested.

Preparation of Blended TCHP Powders

The process sequence for creating blended TCHP powders used in the following inventive examples is described herein, and is described in more detail in Applicant's related application, U.S. Published Appl. No: US2011/0030440 A1, which is herein incorporated by reference in its entirety.

Using a milling container, the proper proportions of TCHP powder and WC—Co matrix powder were weighed. Generally, the total weight of the powders was about 800 g. Thus, to obtain a powder mixture comprising 25 weight % TCHP and 75 weight matrix, about 200 g of TCHP and about 600 g of WC—Co matrix powder were used. In some instances, the raw material WC—Co matrix powder contained a small amount (~2% by weight) of paraffin wax.

If a waxed powder was desired, an additional 2% of paraffin wax was added to the powder mixture, based on the weight of the TCHP particles. Conversely, if an unwaxed powder was desired, no paraffin wax (beyond the amount present in the raw material powders) was added to the mixture.

WC—Co milling balls in an amount corresponding to a ratio of 1.5 kg milling balls:800 g powder mixture were added to the milling container.

If a waxed powder was being prepared, 150 ml of a suitable solvent (e.g., heptane), was added to the powder/milling balls, and the resulting solution was mixed. Additional solvent was added until the solution had a flowable consistency.

For the preparation of an unwaxed powder, 150 ml of a suitable solvent (e.g., ethanol) was added to the powder/milling balls, and the resulting solution was mixed. Additional solvent was added until the solution had a flowable consistency.

The milling container was than filled with argon gas to minimize air exposure and sealed. The contained was then placed on a rolling mill for a desired time-period, e.g., 2 hours at a desired speed (e.g., 100 RPM) resulting in the formation of a milled solution of TCHP/WC—Co powder.

The following is a non-limiting example of a typical drying procedure for a milled solution of TCHP/WC—Co powder prepared according to Example 1.

A milled solution of TCHP/WC—Co powder was decanted through a large sized sieve into a temperature resistant vessel (e.g., glass). The milling container used to produce the powder was rinsed with the corresponding solvent (e.g., heptane or ethanol) to remove any remaining milled solution from the WC—Co milling balls.

The temperature resistant vessel was then placed in a drying oven at a temperature of about 85° C. under a constant nitrogen flow, e.g., of about 2-3 SCFH. The powder was dried for a desired time, e.g., at least 12 hours.

The powder typically caked together during the drying process. To determine whether the powder was dry, a spatula was used to break apart some of the caked powder. The powder was considered sufficiently dry when the caked powder broke apart into a fine powder.

In the case of a waxed powder, after the powder was dried, it was pressed through a coarse sieve (e.g., one having apertures of about 100 μm) to prepare the powder for consolidation.

The dried powders were then stored in argon-filled container (e.g., Nalgene®) containers for later use.

Example 1

FGM Solid Rods Having Different Top and Bottom Materials

Twelve FGM two-material rods were prepared and sinter hot isostatic pressed (HIPed) according to the methods below. The rods were each comprised a top material making up ⅔ of the rod, and a bottom material making up the remaining ⅓ of the rod. Each rod made in this Example was comprised of a TCHP/WC—Co FGM Rod having a ⅜" OD×2½". The specific materials used for top and bottom sections were:

| Top ⅔ Material | Bottom ⅓ Material |
| --- | --- |
| WC-15Co | Ti(C, N) core TCHP TL-3 |

The WC—Co material used in this example comprised 3 micron nominally sized WC with 15 wt % cobalt, and exhibited the following physical properties: Hardness (ASTM B294) of 88.0, an HRA Fracture Toughness (ISO 28079) of 11.49 MPa/m, and a Density (ASTM B311) of 14.05 g/cm³.

The TL-3 had the following Physical Properties: Hardness (ASTM B294) of 92.1, an HRA Fracture Toughness (ISO 28079) of 11.43 MPa/m, and a Density (ASTM B311) of 12.75 g/cm³.

The typical Powder Pressing Method used in this example was comprised of a die tooling set suitable for pressing 2-3" long rod blanks that were inserted into the powder press.

Approximately 23 grams of TCHP powder (grade TL-3) was placed into the bottom of the die cavity. Next approximately 46 grams of WC—Co powder (3 micron nominally sized WC with 15 weight % cobalt) was loaded to fill the remaining volume of the die cavity.

The distinct powders were then conventionally compressed axially at a pressure of 10-12 TSI (tons sq. in.). All green pressed parts were placed on a conventional graphite sintering tray and loaded into the sintering furnace.

The green parts were then HIPed sintered under the following conditions:
  Start at room temperature under vacuum.
  Ramp to 440° C. at a rate of 5° C./min (with Argon at a partial pressure of about 2 Torr).
  Hold at 440° C. for 120 minutes (with Argon at a partial pressure of about 2 Torr).
  Ramp to 1250° C. at a rate of 5° C./min under vacuum.
  Hold at 1250° C. for 30 minutes under vacuum.
  Ramp to 1445° C. at a rate of 5° C./min (with Argon at a partial pressure of 2 Torr).
  Hold at 1445° C. for 60 minutes (with Argon at a partial pressure of 2 Torr).
  Introduce high pressure Argon at approximately 600 PSI and hold pressure for 15-20 minutes.
  Cool down with Argon at a partial pressure of 2 Torr for the first hour of the cool down.

Figure 7:
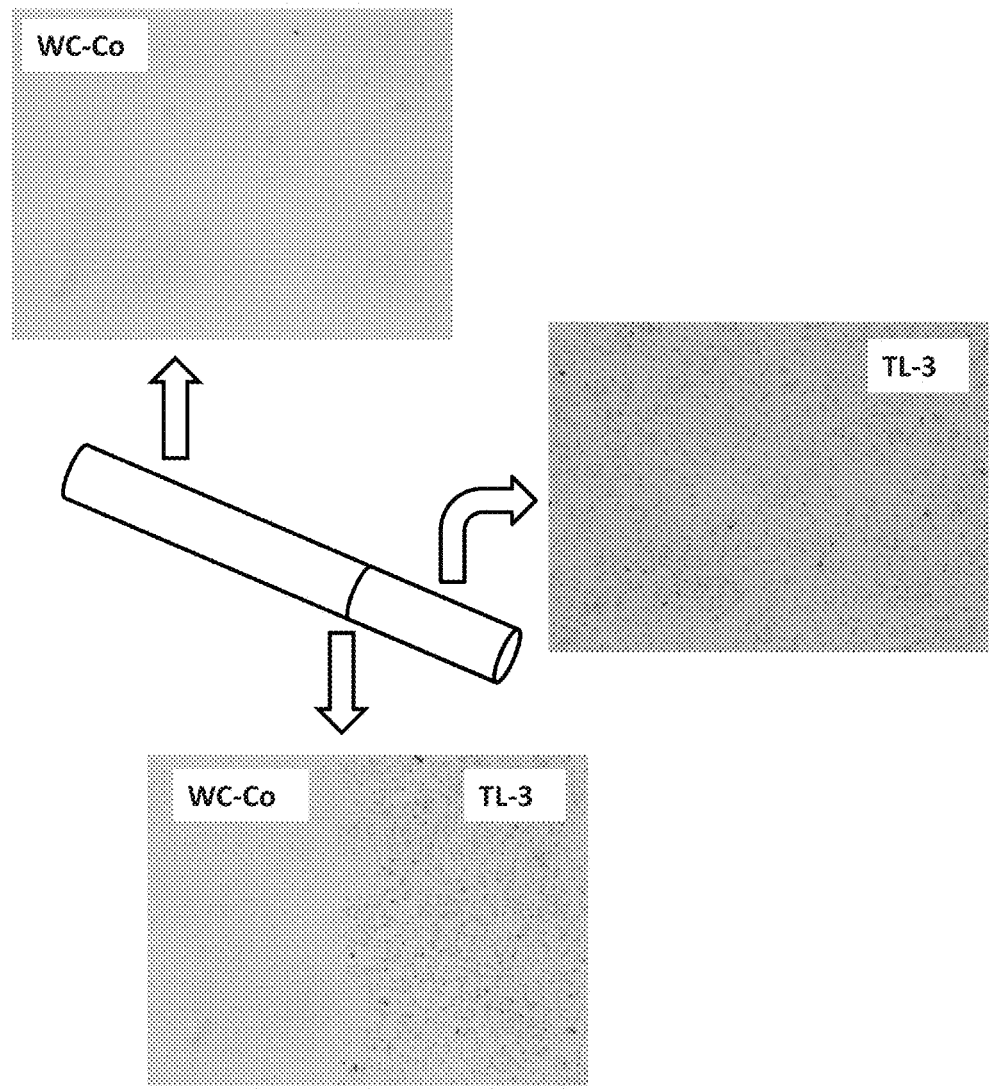
FIG. 7 is a schematic showing an example of a two material FGM rod made according to the present disclosure
Figure 8:
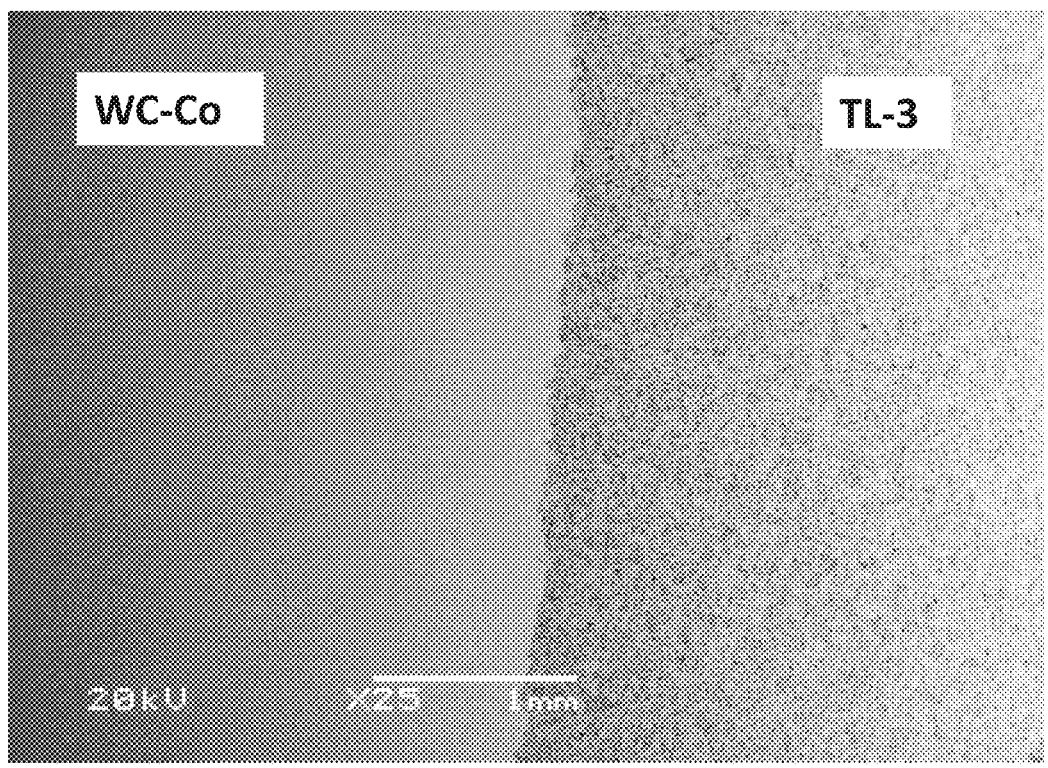
FIG. 8 is a scanning electron micrograph (SEM) showing the interface of the rod of FIG. 7 at 25× magnification.
Figure 9:
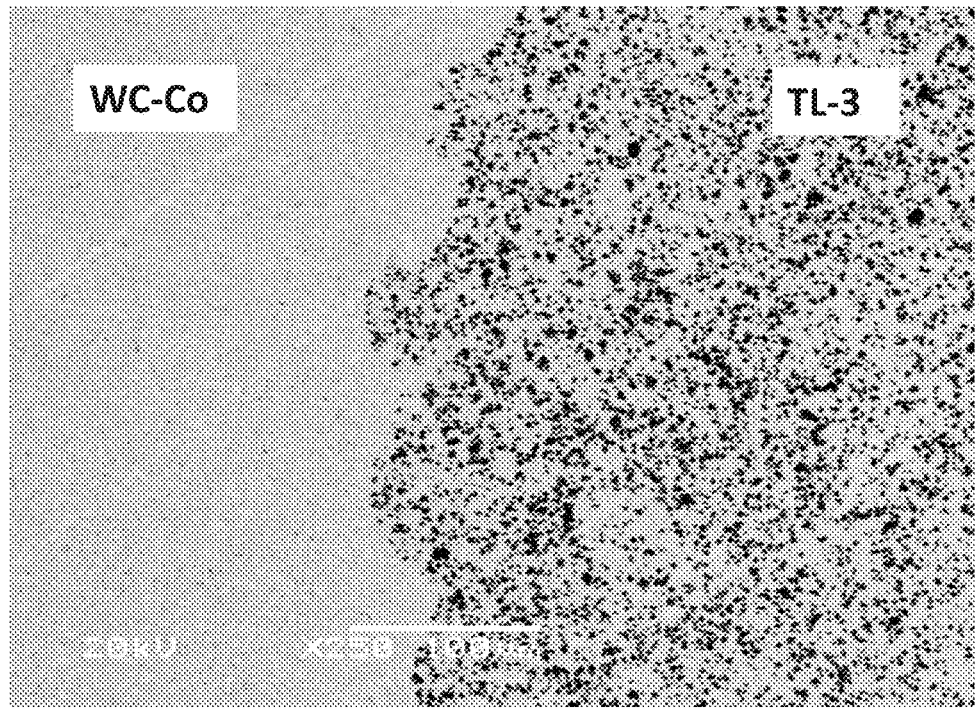
FIG. 9 is a scanning electron micrograph (SEM) showing the interface of the rod of FIG. 7 at 250× magnification.
Figure 10:
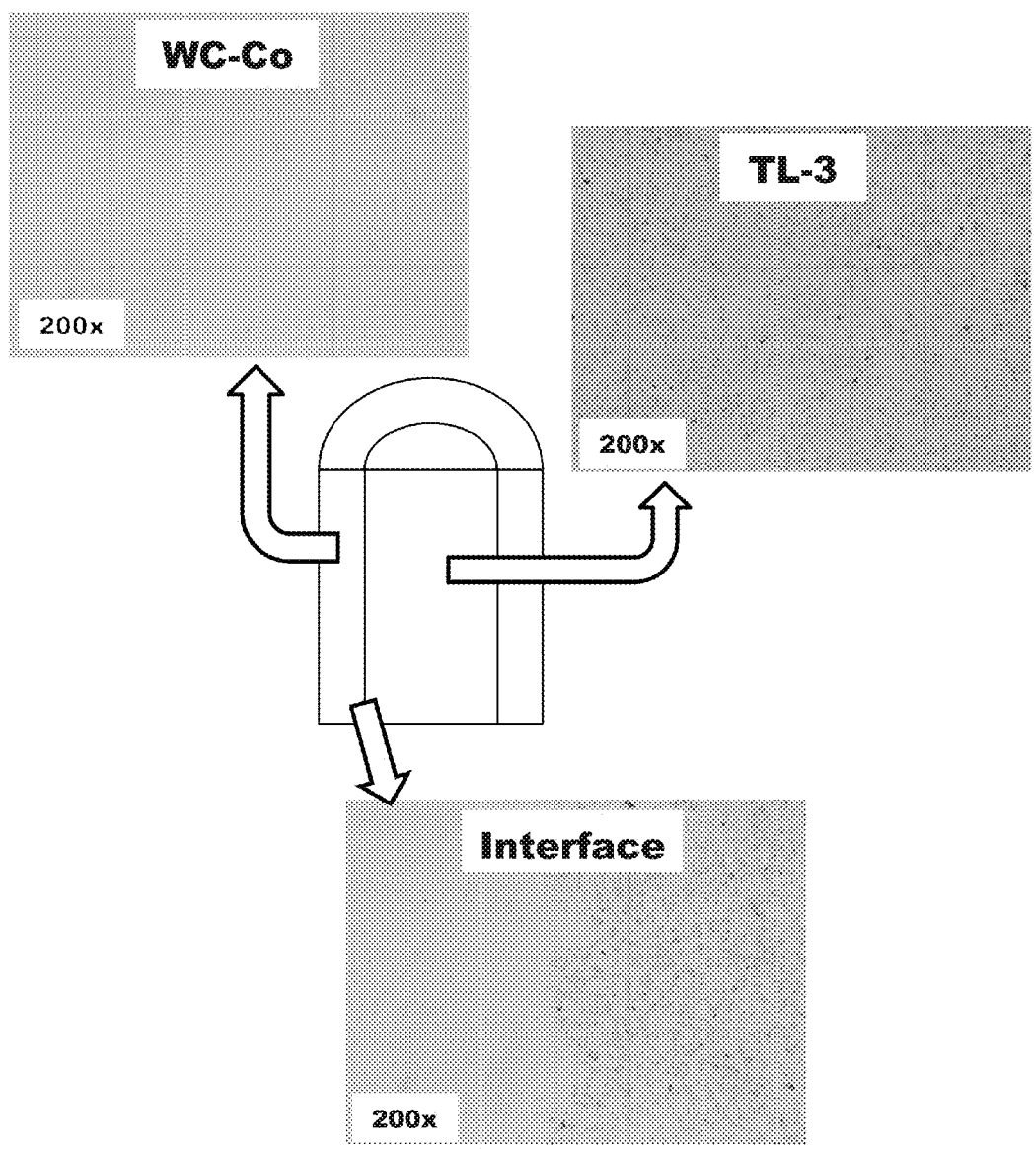
FIG. 10 is a schematic showing an example of a two material FGM cylinder made according to the present disclosure.
Figure 11:
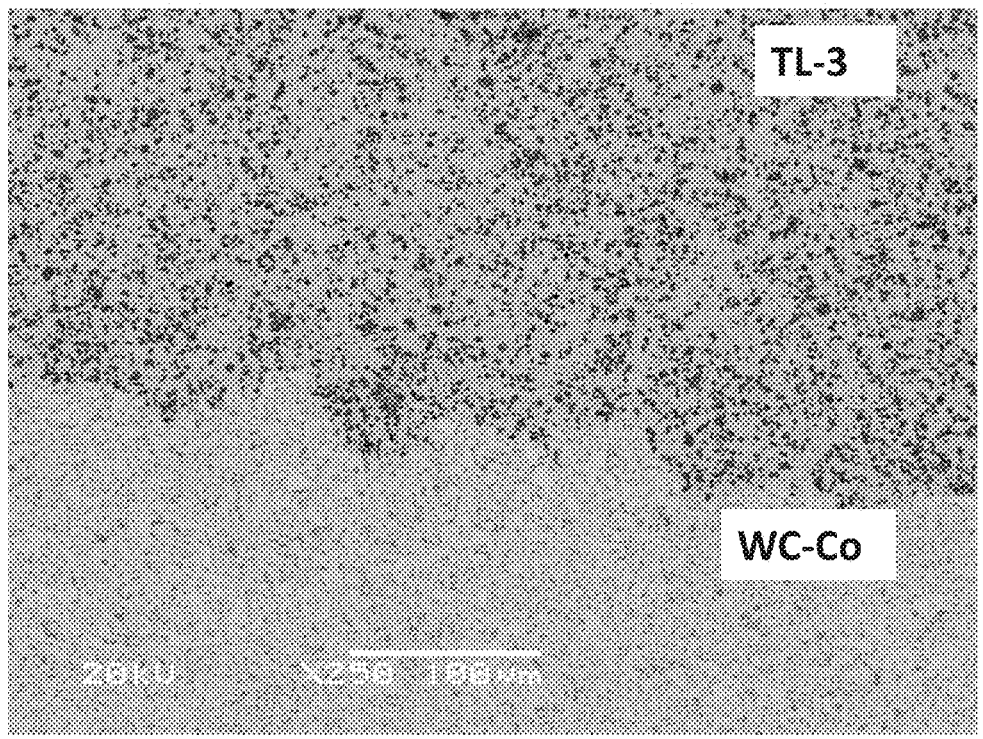
FIG. 11 is a scanning electron micrograph (SEM) showing the interface of the concentric cylinders at 250× magnification of Sample A made in inventive Example 2.
Figure 12:
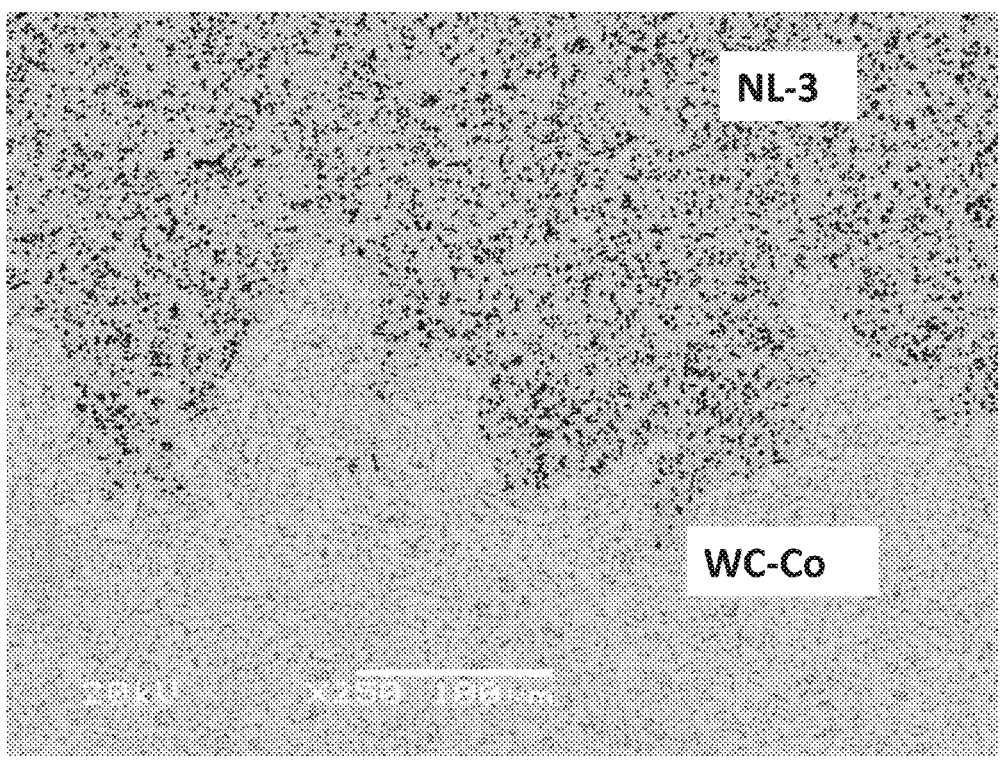
FIG. 12 is a scanning electron micrograph (SEM) showing the interface of the concentric cylinders at 250× magnification of Sample B made in inventive Example 2.
Figure 13:
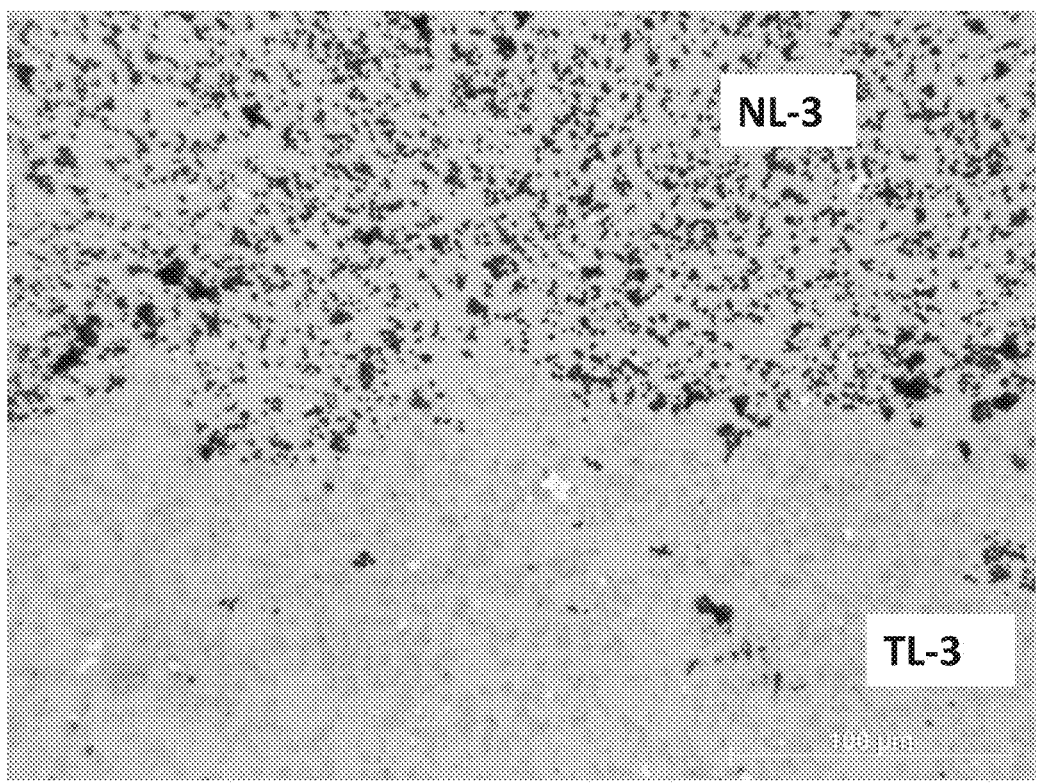
FIG. 13 is an optical photograph at 200× magnification showing the interface of the concentric cylinders of Sample C made in inventive Example 2.
Figure 14:
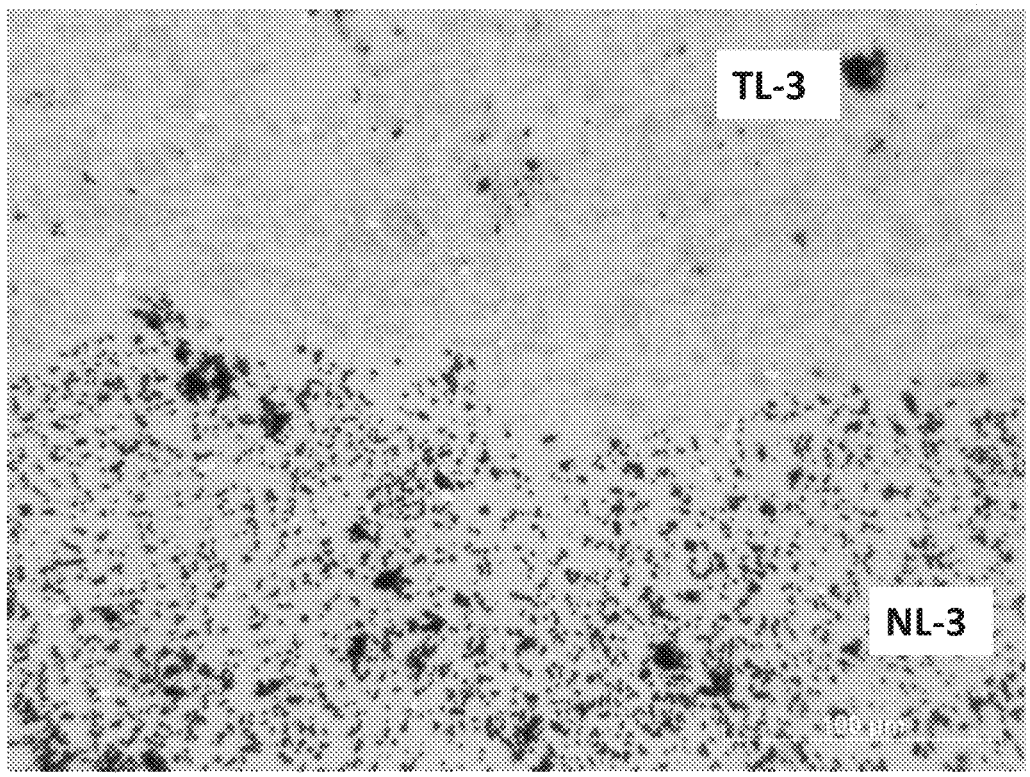
FIG. 14 is an optical photograph at 200× magnification showing the interface of the concentric cylinders of Sample D made in inventive Example 2.

FIG. 7 is a schematic showing an example of a two material FGM rod made according to the present disclosure. FIGS. 8 and 9 are scanning electron micrographs (backscattered mode) at 25× and 250×, respectively, showing the interface of the article of FIG. 7, and described in this example.

Example 2

FGM Cylinders with Different Inner and Outer Materials

Four variations of FGM two-material cylinders were prepared and vacuum sintered as described herein, with the following inner and outer materials.

| Sample | Inner Material | Outer Material |
|---|---|---|
| A | Ti(C, N) core TCHP TL-3 | WC-15Co GWC-50 |
| B | Al$_2$O$_3$ core TCHP NL-3 | WC-15Co GWC-50 |
| C | Al$_2$O$_3$ core TCHP NL-3 | Ti(C, N) core TCHP TL-3 |
| D | Ti(C, N) core TCHP TL-3 | Al$_2$O$_3$ core TCHP NL-3 |

Typical Powder Pressing Method (for FGM Cylinders)

The following provides the methodology used for powder pressing FGM Cylinders made according to the present disclosure.

A thin-walled hollow steel tube (outer diameter 0.340") was placed into the center of the cylindrical die tooling set (diameter 0.580") on a conventional powder press to maintain separation during loading of the two distinct powder types ("inner" and "outer" materials).

Approximately 8 grams of TCHP "inner" powder was placed in the interior of the hollow tube, and approximately 12.5 grams of "outer" powder was placed in the die cavity, outside the tube.

The hollow tube was then removed to minimize disrupting the powder, and then was conventionally axially pressed at a pressure of 7.5-10 TSI (tons sq. in.).

This process was repeated for the different "inner" and "outer" powders, as shown in the sample table above.

All green pressed parts were then placed on a conventional graphite sintering tray and loaded into the vacuum sintering furnace, and sintered as described below.

Typical Vacuum Sintering Cycle

The following provides the methodology used for vacuum sintering FGM Cylinders made according to the present disclosure. The green parts were then sintered under the following conditions:

Start at room temperature under vacuum.
Ramp to 440° C. at a rate of 5° C./min (with Argon at a partial pressure of about 2 Torr).
Hold at 440° C. for 120 minutes (with Argon at a partial pressure of about 2 Torr).
Ramp to 700° C. at a rate of 5° C./min under vacuum.
Hold at 700° C. for 60 minutes under vacuum.
Ramp to 1250° C. at a rate of 5° C./min under vacuum.
Hold at 1250° C. for 30 minutes under vacuum.
Ramp to 1400° C. at a rate of 5° C./min (with Argon at a partial pressure of 2 Torr).
Hold at 1400° C. for 60 minutes (with Argon at a partial pressure of 2 Torr).
Cool down with Argon at a partial pressure of 2 Torr for the first hour of the cool down.
Final sintered FGM part weights are about 20 grams (green weights slightly higher, about 20.5 grams).

FIGS. 11-14 are optical photographs and scanning electron micrographs (backscattered mode) at various magnifications showing the interfaces of Samples A-D, described in this example. The interface between the inner and outer materials is clearly evident on each micrograph.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is to be understood that the foregoing description is exemplary and explanatory only, and is not to be interpreted as restrictive of the disclosure. Moreover, it should be understood that various features and/or characteristics of differing embodiments herein may be combined with one another. Therefore modifications and variations may be made to the illustrative embodiments and other arrangements may be devised without departing from the spirit or scope of the invention. Since modifications combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method of making a metallic or ceramic component, said method comprising:
   a) providing at least one first powder, said first powder comprising a plurality of composite particles, made of a core particle material, an intermediate layer on said core particle material, and an outer layer, wherein said core particle material has a hardness higher than both the intermediate layer and the outer layer, and said intermediate layer has a fracture toughness greater than both the core particle material and the outer layer;
   b) providing at least one second powder comprising a carbide material;
   c) forming a green body comprised of said first and second powder mixtures such that the first powder mixture forms a first portion of said green body with the second powder mixture forming a second portion of said green body;
   d) molding, pressing or shaping said green body to form a compact; and
   e) sintering said compact to form an article having portions of different juxtaposed properties, said first portion of said green body forming hard wear-resistant portion of said article and said second portion of said green body forming a tough, strong load bearing portion of said article.

2. The method of claim 1, wherein said at least one first powder comprises a core particle comprising a compound selected from the group consisting of: TiN, Ti(C,N), TiC, TiB$_2$, ZrC, ZrN, ZrB$_2$, VC, VN, cBN, Al$_2$O$_3$, Si$_3$N$_4$, SiB$_6$, SiAlCB, W$_2$B$_5$, AlN, AlMgB$_{14}$, MoFeB (iron molybdenum boride), MoS$_2$, MoSi$_2$, Mo$_2$B$_5$, Mo$_2$B, and diamond.

3. The method of claim 1, wherein said at least one first powder comprises an intermediate layer on said core particles, said intermediate layer comprising at least one compound selected from WC, W$_2$C, tool steel, glassy and devitrified nanosteel alloys, silicon nitride, tantalum carbide, or combinations thereof.

4. The method of claim 1, wherein said outer layer comprises Co, Fe, Ni, or combinations thereof.

5. The method of claim 4, wherein said at least one first powder comprises 9-10% by weight Co.

6. The method of claim 1, wherein said at least one second powder comprising a carbide material comprises WC—Co.

7. The method of claim 4, wherein said WC—Co has a particle size ranging from 0.5 to 5.0 micrometers.

8. The method of claim 1, wherein the first and second powder mixtures of the green body are assembled under pressure ranging from 20,000-40,000 psi.

9. The method of claim 1, wherein said molding, pressing or shaping comprises at least one method chosen from injection molding, extrusion, calendering, tape-casting, powder layering, or at least one additive manufacturing process.

10. The method of claim 1, wherein the first and second powder mixtures form layers of the green body which are assembled into continuous rods, concentric cylinders or flat laminations, or more complex shapes.

11. The method of claim 1, wherein the first and second powder mixtures of the green body are assembled at a temperature ranging from 30-200° C.

12. The method of claim 1, wherein the green body assembly is sintered after compaction by a method selected from liquid phase sintering, hot pressing, hot isostatic pressing, sinter-HIP, spark plasma sintering, sinter forging, microwave, or rapid omnidirectional consolidation.

13. The method of claim 1, wherein the green body assembly is sintered in an inert, carburizing, decarburizing or reducing, nitrogen, pressure or vacuum atmosphere.

14. The method of claim 1, wherein the diameters of the first powder core particles and second powder particles comprising said green body assembly are in the range of about 0.5 to about 30 micrometers.

15. The method of claim 1, wherein at least one of said first powder or said second powder are mixed with at least one additive chosen from paraffin waxes, stearic acid, ethylene bis-stearamide (EBS), polyvinyl alcohol, polyethylene glycol, and co-polymers with a plurality of said component particles prior to or simultaneous with said shaping.

16. The method of claim 1, wherein said metallic or ceramic component comprises a functionally graded material, or a multi-component material.

17. A method of making a metallic or ceramic component, said method comprising:
a) providing at least one first formed green article, said formed green article comprising:
a plurality of composite particles, made of a core particle material, an intermediate layer on said core particle material, and an outer layer, wherein said core particle material has a hardness higher than both the intermediate layer and the outer layer, and said intermediate layer has a fracture toughness greater than both the core particle material and the outer layer;
b) providing at least one support powder comprising a carbide material;
c) forming a second green body comprised of said first green article and said at least one support powder;
d) compacting said first green article and said support powder to form a compact; and
e) sintering said compact to form an article having portions of different juxtaposed properties.

18. A sintered article comprising at least two distinct and adjacent compositional regions, comprising:
a first composition comprising:
a plurality of core particles comprising a compound selected from the group consisting of: TiN, Ti(C,N), TiC, TiB$_2$, ZrC, ZrN, ZrB$_2$, VC, VN, cBN, Al$_2$O$_3$, Si$_3$N$_4$, SiB$_6$, SiAlCB, W$_2$B$_6$, AlN, AlMgB$_{14}$, MoS$_2$, MoSi$_2$, Mo$_2$B$_5$, Mo$_2$B, MoFeB (iron molybdenum boride), and diamond;
an intermediate layer on said core particles, said intermediate layer comprising at least one compound selected from WC, W$_2$C, tool steel, glassy and devitrified nanosteel alloys, silicon nitride, tantalum carbide, or combinations thereof; and
an outer layer located on said intermediate layer which comprises Co, Fe, Ni, or combinations thereof; and
a second composition comprising a carbide material.

19. The article of claim 18, wherein said second composition comprises WC—Co.

20. The article of claim 18, wherein said first composition comprises 9-10% by weight Co.

21. The article of claim 18, wherein said article comprising:
drills, mills, cutting or forming tools, drawing dies, extrusion dies, forging dies, cutting and stamping dies, forms, forming rollers, injection molds, shears, saws, hobs, breaches, reamers, taps;
individual mechanical parts chosen from gears, cams, journals, nozzles, seals, valve seats, pump impellers, capstans, sheaves, bearings, and wear surfaces;
integrated co-sintered components to replace mating parts, internal combustion engine rods, bearings, camshafts, transmission parts; and
electromechanical components such as memory drive reading heads and specialized magnets.

22. The article of claim 18, wherein said article comprises a working region that is comprised substantially of said first composition, and a support region that is comprised substantially of said second composition.

23. The article of claim 18, wherein said at least two distinct and adjacent compositional regions comprises a functionally graded material, or a multi-component material.

* * * * *